United States Patent [19]

Kasai et al.

[11] Patent Number: 4,866,687
[45] Date of Patent: Sep. 12, 1989

[54] OPTICAL DISC ACCESS METHOD AND OPTICAL DISK STORAGE USING COARSE AND FINE ACTUATORS

[75] Inventors: Masuo Kasai, Hachioji; Takeshi Maeda, Kokubunji; Kazuo Shigematsu, Saitama; Toshimitsu Kaku, Sagamihara; Masahiro Takasago, Odawara, all of Japan

[73] Assignee: Hitachi, Ltd., Tokyo, Japan

[21] Appl. No.: 240,487

[22] Filed: Sep. 6, 1988

Related U.S. Application Data

[63] Continuation of Ser. No. 868,021, May 29, 1986, abandoned.

[30] Foreign Application Priority Data

| May 31, 1985 | [JP] | Japan | 60-116415 |
| Jun. 5, 1985 | [JP] | Japan | 60-120475 |
| Jun. 5, 1985 | [JP] | Japan | 60-120476 |
| Jul. 29, 1985 | [JP] | Japan | 60-165779 |

[51] Int. Cl.[4] .................. G11B 21/08; G11B 7/085
[52] U.S. Cl. .................... 369/32; 369/33; 369/43; 369/44; 250/202; 358/907; 360/78.05
[58] Field of Search ............ 369/32, 33, 41, 43–46; 250/202; 358/907; 360/77.02, 78.05

[56] References Cited

U.S. PATENT DOCUMENTS

| 3,924,268 | 12/1975 | McIntosh et al. | 360/78 |
| 4,106,058 | 8/1978 | Romeas et al. | 369/32 |
| 4,138,663 | 2/1979 | Lehureau et al. | 369/33 |
| 4,236,232 | 11/1980 | Jansen et al. | 369/44 |
| 4,562,562 | 12/1985 | Moriya et al. | 369/46 |
| 4,598,394 | 7/1986 | Nonaka | 369/44 |
| 4,607,358 | 8/1986 | Maeda et al. | 369/32 |
| 4,611,315 | 9/1986 | Ogino | 369/33 |
| 4,615,023 | 9/1986 | Inada et al. | 369/32 |
| 4,627,039 | 12/1986 | Meyer | 369/44 |
| 4,630,250 | 12/1986 | Nonomura | 369/32 |
| 4,644,514 | 2/1987 | Ohshima et al. | 369/33 |

FOREIGN PATENT DOCUMENTS

| 49-50954 | 5/1974 | Japan . |
| 49-60702 | 6/1974 | Japan . |
| 49-94304 | 9/1974 | Japan . |
| 50-68413 | 6/1975 | Japan . |
| 58-57637 | 4/1983 | Japan | 369/32 |
| 60-83227 | 5/1985 | Japan | 369/32 |

*Primary Examiner*—Aristotelis M. Psitos
*Assistant Examiner*—Steven R. Garland
*Attorney, Agent, or Firm*—Antonelli, Terry & Wands

[57] ABSTRACT

An optical disk storage access method using a fine and coarse actuators for positioning a light spot to an intended track on the disk, wherein a pulse is generated each time the light spot has traversed a track, the pulses are counted to determine the distance from the current spot position to a target track, the fine actuator is activated depending on the measured distance, and the fine and coarse actuators are operated in unison so that the light spot is positioned to the target track.

12 Claims, 13 Drawing Sheets

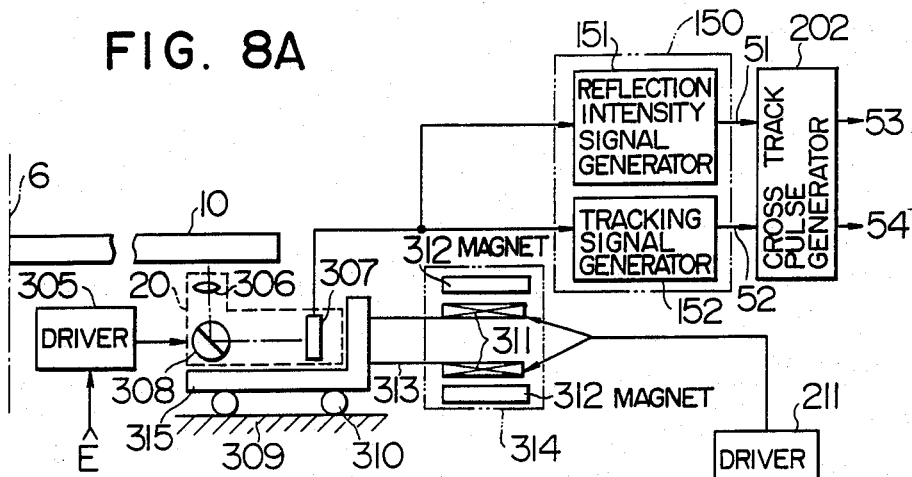
FIG. 8A
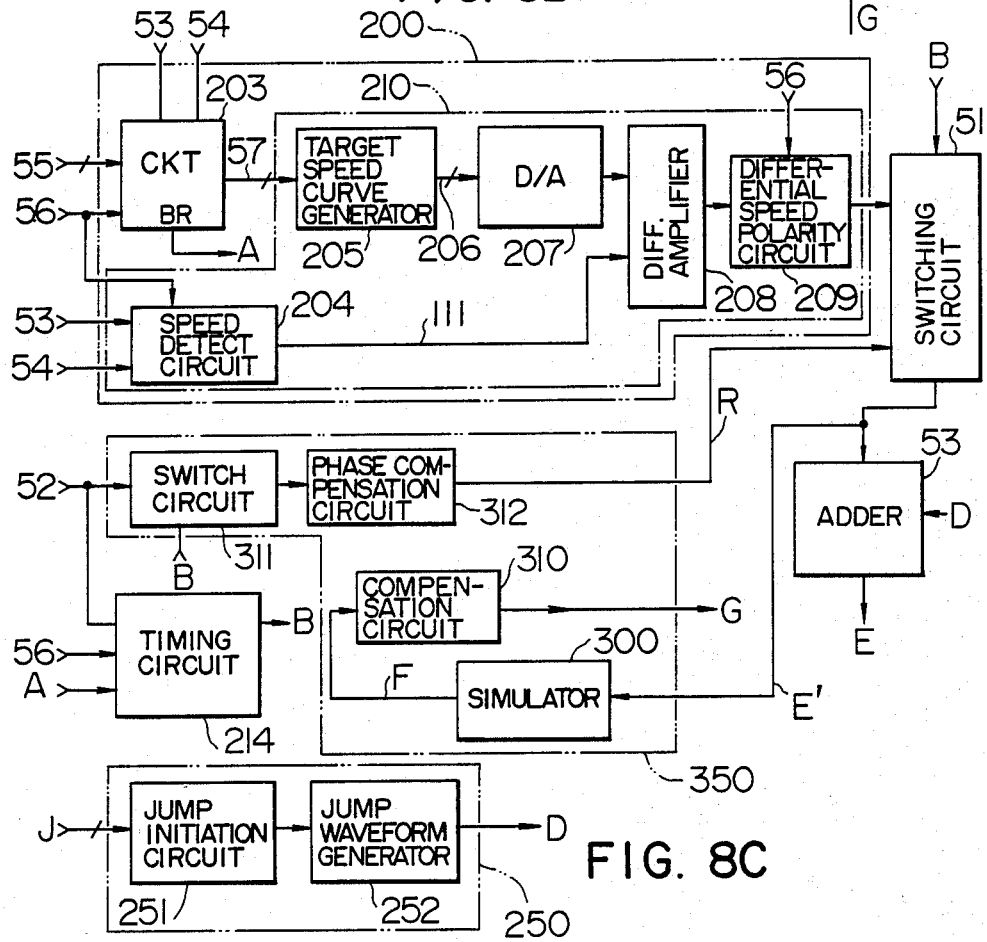
FIG. 8B
FIG. 8C

FIG. 9A
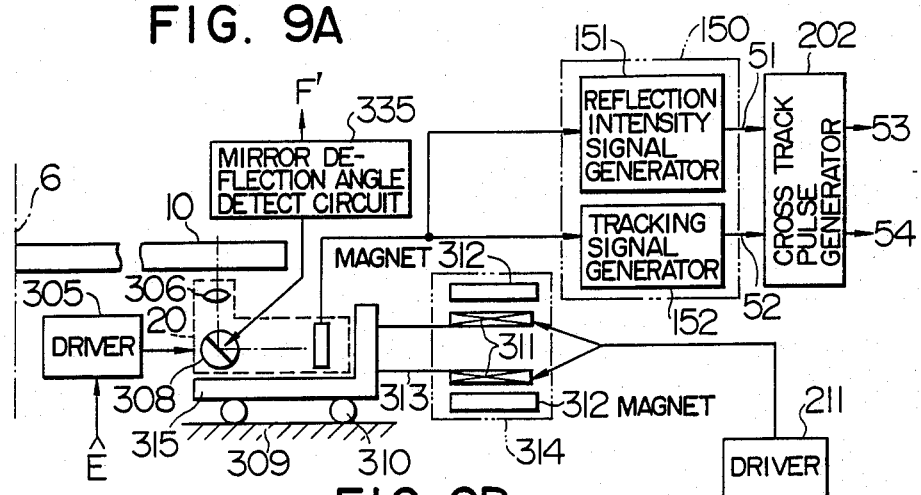
FIG. 9B
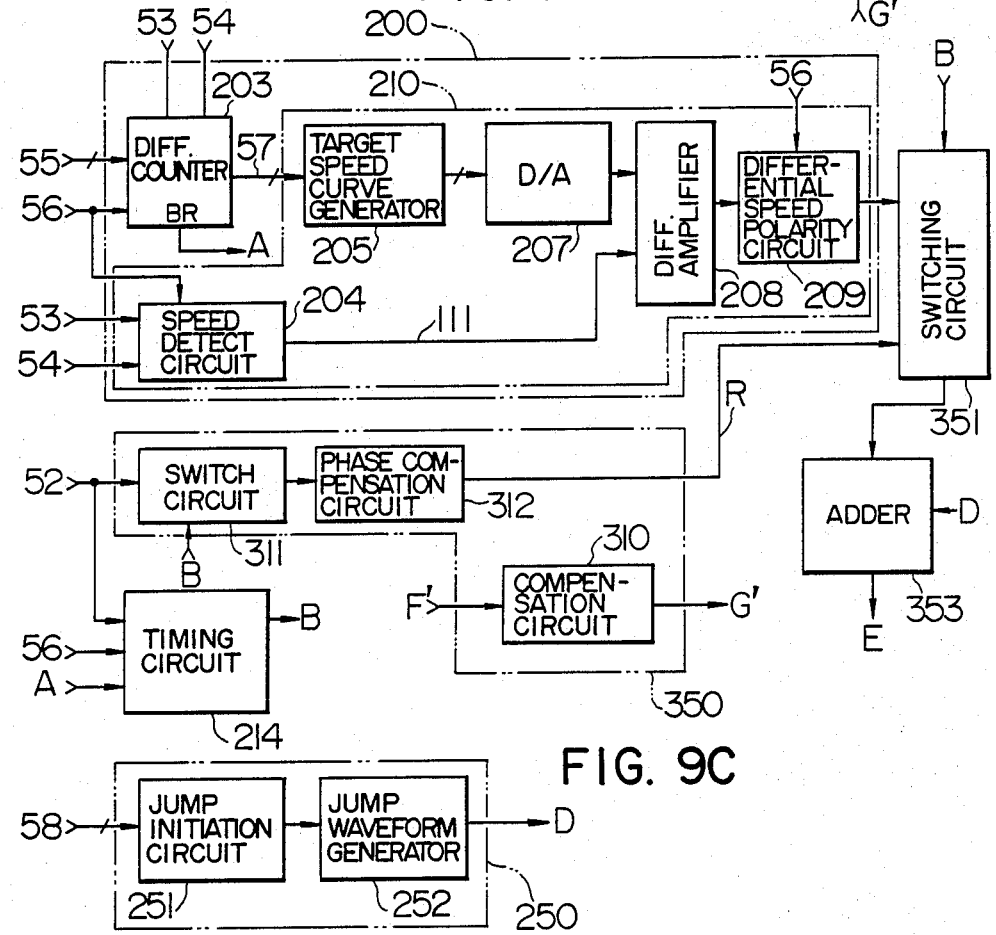
FIG. 9C

OPTICAL DISC ACCESS METHOD AND OPTICAL DISK STORAGE USING COARSE AND FINE ACTUATORS

This application is a continuation of application Ser. No. 868,021 filed May 29, 1986, now abandoned.

BACKGROUND OF THE INVENTION

This invention relates to an optical disk access method for searching for an intended target track among numerous tracks formed on an optical disk, and particularly to an optical disk access method and an optical disk storage using this method in which a light spot is positioned to an intended target track by use of a coarse actuator and a fine actuator.

There has been developed the optical disk storage in which high density information is recorded and reproduced on a rotary recording medium which can also be erased when necessary. The rotary recording medium, i.e., optical disk, is provided with numerous recording tracks at a constant track pitch in the form of concentric circles or a spiral, and each track is segmented into several sectors for partitioning stored data. In recording, retrieving or erasing information at an arbitrary location on the disk, the disk storage is subjected to the access operation (seek operation) for finding the intended track among numerous tracks on the disk surface and then finding the intended sector on the track. The operation involves a coarse seek control which quickly moves the light spot to the vicinity of the target track, a tracking control which maintains the light spot on the center of the track, and a fine seek control (jump control) which corrects the deviation of the light spot from the target track. The above optical disk access operation is described in Japanese Patent Unexamined Publication Nos. 58-91536 and 58-169370 (equivalent to U.S. patent application Ser. No. 736,125, now U.S. Pat. No. 4,607,358, which is a continuation application of U.S. patent application Ser. No. 443,399, abandoned; EPC Application No. 821109071).

The above-mentioned optical disk storage implements the light spot positioning control by using a coarse actuator such as a linear motor for moving the optical head and a fine actuator, such as a galvanomirror or a voice coil for driving an objective lens, mounted on the optical head. The coarse positioning for the optical recording/reproduction head to a track on the optical disk uses as a position sensor an external scale such as an optical linear scale fixed on the base. The external scale has a scale pitch equal to a multiple of the track pitch. After the coarse seek operation has settled, a temporary tracking control takes place to evaluate the deviation of the head position from the target track by reading the current track address. In order to correct the deviation from the target track, the fine positioning mechanism such as a galvanomirror mounted on the optical head is activated to move the light spot on a track-by-track basis, and the light spot is finally positioned to the target track.

The optical disk storage takes an access time which is the sum of a seek time in which the recording/reproduction light spot is moved to a target track and a time in which the disk rotates until a target sector is reached. The disk rotation time is determined in many cases from the data transfer rate of the system, and therefore the key factor for the reduction of the access time is to minimize the seek time. Particularly, a high-speed seek operation takes a longer settling time relative to the coarse seek time, and it cannot be neglected. In case a high-speed disk has a larger eccentricity, it will take a considerable time before the normal tracking takes place after the tracking servo system has been activated.

Besides the two-stage seek control involving the coarse seek and fine seek as described above, there is another seek control known as cross tracking. The cross tracking control, as disclosed in the above-mentioned Japanese Patent Unexamined Publication No. 58-91536, is to position the optical head to a target track using a coarse actuator by counting track traverse pulses each generated when the head moves across a track. However, in a high-speed seek operation, the header and data signals written on the disk intermingle with the tracking error signal, and the coincidence of its band with the band of track traverse pulses causes erroneous counting of tracks, and therefore this seek control system is not suitable for the high-speed access operation.

SUMMARY OF THE INVENTION

The present invention is intended to overcome the foregoing prior art deficiencies, and its prime object is to provide an optical disk access (high-speed seek) method and an optical disk storage using this method in which the coarse seek settling time is reduced, the tracking control can be started up stably in a minimal time, and the access time (particularly the seek time) is reduced significantly.

The two-stage seek control needs to wait until the coarse seek operation settles, and it is intended to eliminate the waiting period without leaving any adverse influence on the following operation. The inventive method is designed to move the light spot in a relatively short distance by using the fine movement mechanism under cross tracking control. Namely, a fast-operating fine actuator is used to move the light spot while counting tracks which have been passed, thereby achieving a high-speed light spot movement for a relatively short traversing distance. Although the inventive cross-track seek operation by the fine movement mechanism takes place faster than the settling operation by the coarse movement mechanism, it is not so fast as for the band of the header and data signals recorded on the disk to coincide with the band of track traverse pulses each generated when the light spot moves across each track, and therefore the signals can be separated, tracks can be counted correctly, and the light spot can be moved to a target track correctly at high speed.

The cross-track seek operation by the fine movement mechanism produces the light spot movement at a relative speed with respect to a track position on the optical disk, without being affected by the eccentricity of the disk, and the speed of the light spot relative to the track after the cross-track movement is low. Therefore, the light spot is prevented from going out of the track at the initiation of the tracking operation and, at the same time, the tracking operation can be started with a minimal waiting time.

In the two-stage seek control according to the first embodiment of this invention, the coarse movement mechanism moves the optical head to a position which is short of a small distance from the target of the coarse seek operation by making reference to an external scale such as a linear encoder and enters the settling operation at this position, and thereafter the cross-track seek operation by the above-mentioned fine movement mechanism and the coarse seek operation by the coarse movement mechanism take place concurrently so that the light spot is moved for the remaining small distance by the number of tracks equal to the distance for the correction of the rounding error of the linear encoder. Namely, after the coarse seek operation has entered the settling phase, the coarse movement mechanism and fine movement mechanism operate in unison to move the light spot.

Following the cross track operation by the fine movement mechanism, the tracking operation takes place temporarily to evaluate the deviation from the target track by reading the current track address. The fine movement mechanism implements the positional modification (jump control) in response to the evaluated deviation, and the light spot is positioned to the target track. In the settling cross-track seek operation by the fine movement mechanism for correcting the rounding error of the linear encoder in the above-mentioned small distance, it is further possible to correct the eccentricity of the optical disk. This corrective operation enables the light spot following the settling cross-track seek operation to be positioned much nearer to the target track, which reduces the distance to be corrected by the subsequent fine seek operation (jump control), and the fine seek time can further be reduced.

According to the second embodiment of this invention, the cross-track seek operation by the fine movement mechanism takes place to move the light spot while counting the number of tracks traversed, and at the same time the coarse movement mechanism is controlled in response to the detection of the movement of the fine movement mechanism, whereby the light spot is moved to the target track by the associated operation of the coarse and fine movement mechanisms. Following the cross-track seek operation, the tracking operation takes place temporarily to read the track address and evaluate the deviation from the target track, and the fine movement mechanism responds to the deviation to move the light spot on a track-by-track basis until it reaches the target track, as in the case of the first embodiment.

BRIEF DESCRIPTION OF THE DRAWINGS

FIGS. 8A, 8B and 8C are block diagrams showing another embodiment of this, invention;

FIGS. 9A, 9B and 9C are block diagrams showing a modified embodiment based on one shown in FIG. 8;

DESCRIPTION OF THE PREFERRED EMBODIMENTS

Figure 1:
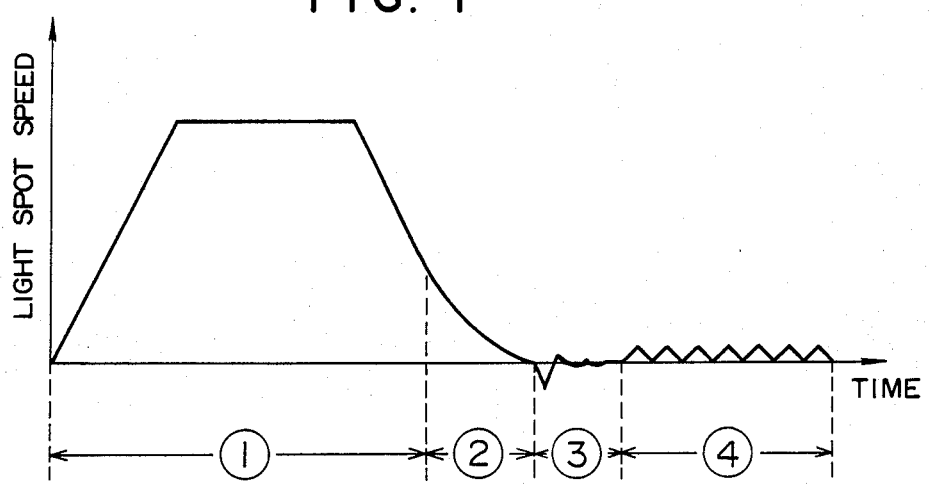
FIG. 1 is a diagram used to explain the seek time of the optical disk storage.

Referring to FIG. 1, the two-stage seek operation has a total seek time, which includes: (1) time spent for the coarse seek movement, (2) settling time for the coarse seek operation to get a positioning accuracy within a pitch of the linear encoder, (3) time spent after the tracking servo system has started until the tracking operation actually commences, and (4) time spent for the fine seek movement. In the case of the high-speed seek operation, the settling time (2) becomes longer than the coarse seek movement time (1), and it cannot be neglected. In another case where the disk turning speed is high and the disk is largely eccentric, the light spot movement speed relative to the disk track can increase after the coarse seeking, causing the light spot to off-track even after the tracking servo system has started for reading the track address, and this results in a prolonged period (3) before the tracking operation actually commences.

In regard to the positioning accuracy, the linear encoder has an inferior resolution relative to the track pitch, which not only creates a rounding error and quantization error, but a deviation of the light spot from the correct target position which moves during the coarse seeking due to the eccentricity of the disk. This causes an increased distance to be corrected by the subsequent fine seek operation, resulting in a prolonged fine seek time (4).

In this invention, the high-speed fine movement mechanism operates in cross-track seek mode to move the light spot while counting the number of tracks traversed, and the coarse movement mechanism and fine movement mechanism operate in unison to move the light spot toward the target track, so that the light spot movement in a relatively short distance is carried out at high speed. The cross-track seek operation by the fine movement mechanism is faster than the settling operation by the coarse movement mechanism, and therefore the settling period (2) can be reduced. The operation speed is not so high as to cause the overlapping of the band of the header and data signals written on the disk and the band of pulses produced when the light spot traverses tracks, and therefore the signals can be separated and the number of tracks can be counted correctly. In addition, the light spot has a small relative speed against the disk track following the movement, which is a feature of the cross-track control mode as mentioned previously, and reading of the track address after the coarse seek operation prevent off-tracking from occurring when the tracking servo system starts, whereby the period (3) until the tracking operation starts can be reduced. By correcting errors other than the quantization error of the linear encoder, e.g., the error due to the eccentricity of the disk, in the cross-track seek operation by the fine movement mechanism, the light spot position at the end of the cross-track seek operation can be made significantly nearer to the target track, which reduces the distance to be corrected in the subsequent fine seek operation (jump control), whereby the fine seek period (4) can be reduced.

First, the method of producing the signals indicating the track traversing direction and completion of track traversing by the light spot (track transition pulse) from the disk reflection or transmission intensity signal and the tracking signal for use in detecting accurately the light spot position on the optical disk will be described.

Figure 2A:
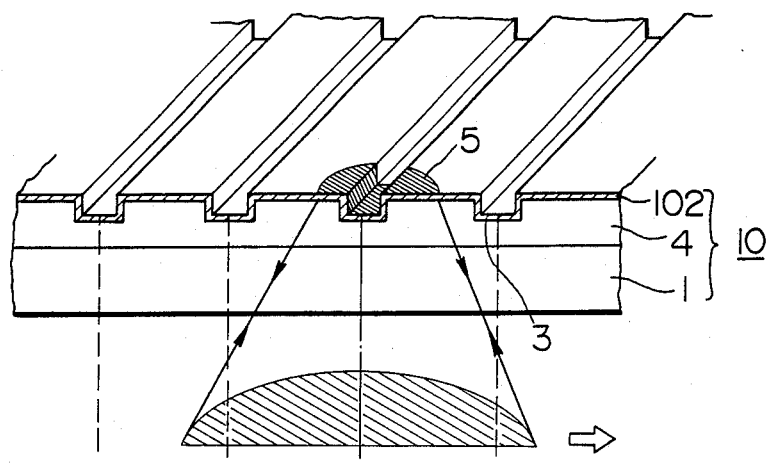
FIGS. 2A, 2B and 2C are diagrams used to explain the method of signal detection when the light spot traverses a track.

In FIG. 2A, a light beam emitted from a light source on the optical head is focused by an objective lens (not shown) and projected through a transparent disk substrate 1 and a UV resin 4, in which guide grooves 3 are formed, onto a recording film 2 to form a light spot 5. The optical disk 10 is rotatable around the spindle, and it has the formation of guide grooves 3 in a phase structure extending in the circumferential direction with a spacing being provided between adjacent grooves along the radial direction. Each circular groove is divided into several sectors, and each sector has a header section where the header signals including the track address and sector address for identifying the sector are recorded in advance in the form of pits, and a data section located next to the header section. The guide groove 3 serves as an optical guide for the light spot 5 in recording, reproducing or erasing information in the data section. Information is recorded in the guide groove or on the flat portion (land) between grooves along the guide groove 3 by the light spot 5 which is intensity-modulated by the information to be recorded. Accordingly, the track center coincides with the center line of the guide groove 3 when recording information in the guide groove, or coincides with the center line between adjacent guide grooves when recording information on the land between grooves. In the latter case of recording information on the land between guide grooves, the header signal is recorded in advance in the form of pits on the land. Pits for the header signals have an optical depth which is preferably a quarter of the wavelength λ of the light beam forming the light spot 5, and the guide groove 3 has an optical depth which is preferably ⅛ of the wavelength. Header signal pits are not shown in FIG. 2A. Various recording films 102 are used depending on the recording system. For example, the ablative recording system uses a PbTeSe film, while the opto-magnetic recording system uses a perpendicularly magnetized film which mainly consists of TbFe.

Figure 2B:
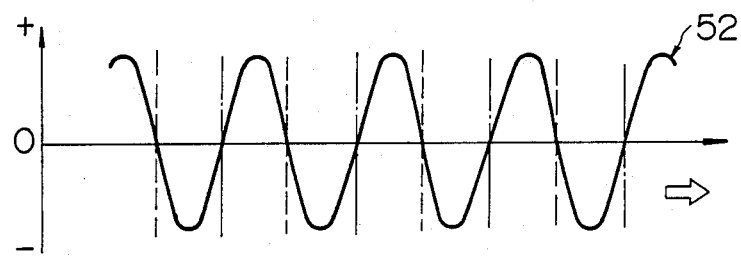

For the objective lens having an NA (Numerical Aperture) of 0.50 and the light source having a wavelength (λ) of 830 nm, the light spot 5 has a size (the diameter on which the intensity is equal to $1/e^2$) of about 1.6 μm. When the light spot moves in the direction shown by the arrow (disk radial direction) across the guide grooves 3 which is formed at an interval of 1.6 μm on the disk, the tracking signal 52 which represents the deviation of the spot center from the track center varies as shown in FIG. 2B. There are several methods for producing the signal 52, such as that using two light spots as disclosed in Japanese Patent Unexamined Publication No. 49-50954, the spot wobbling method as disclosed in Japanese Patent Unexamined Publication No. 49-94304, the track wobbling method as disclosed in Japanese Patent Unexamined Publication No. 50-68413, and the method of using the diffraction light as disclosed in Japanese Patent Unexamined Publication No. 49-60702. All of these methods are described in detail in the above-mentioned Japanese Patent Unexamined Publication No. 58-91536 (U.S. Pat. No. 4,607,358.

Figure 3:
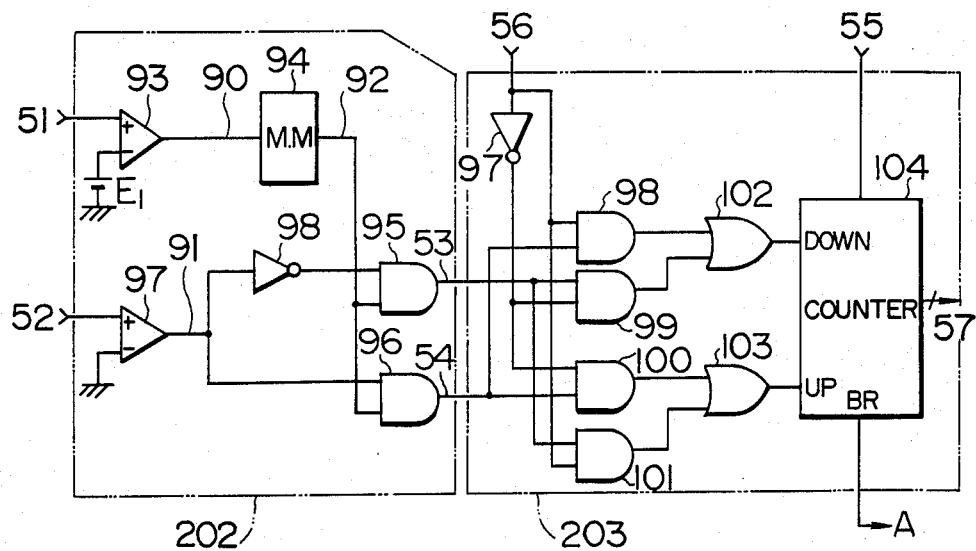
FIG. 3 is a block diagram showing, as an example, the circuit for detecting the cross-track pulse.
Figure 2C:
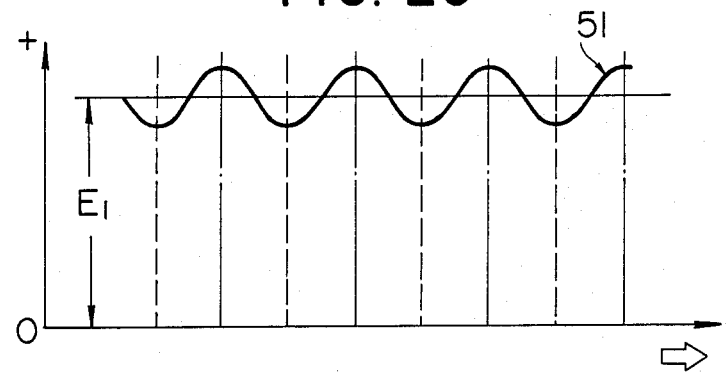

As the light spot moves in the direction shown by the arrow, the reflected light intensity from the disk surface varies as shown in FIG. 2C. The reflected light intensity is minimum at the center of the guide groove 3, and it is maximum at the center between adjacent guide grooves. The electrical signal 51 produced from the reflected light intensity by the photosensor has the same period as the tracking signal 52, and these signals are out of phase with each other by 90°. The reflection intensity signal 51 is also used to detect information signals recorded on the disk. The tracking signal 52 has a zero amplitude at the track center and provides opposite polarities depending on whether the light spot is located on the right side (outer side of the disk) or left side (inner side of the disk). This property of the tracking signal is used to determine the traversing direction of the light spot across the track. For example, the circuit arrangement disclosed in the above-mentioned Japanese Patent Unexamined Publication No. 58-91536 produces a positive edge signal 54 when the light spot traverses a track outwardly and a negative edge signal 53 when the light spot traverses a track inwardly. These edge signals 53 and 54 are used as track traverse pulses to know the number of remaining tracks before the target track is reached, which is necessary in the cross-seek control. In the circuit of FIG. 3, for example, the access polarity signal 56 indicating the access direction is given a logical "0" level when making access inwardly. The logic circuit consisting of logic elements 97–103 causes the positive edge signal 54 to be selected and received by the UP terminal of the counter 104 and the negative edge signal 53 to be selected and received by the DOWN terminal of the counter 104. The counter 104 is preset to the absolute value of a distance to the target track at the beginning of the cross-track seek operation. When the light spot starts moving inwardly on the disk, a negative edge pulse 53 is produced each time the light spot traverses a track, and it decrements the contents of the counter 104. If the light spot makes a return movement at an intermediate position by some reason to traverse a track outwardly, a positive edge signal 54 is produced to increment the counter contents, and the counter 104 provides an accurate absolute value 57 indicating the number of remaining tracks in the cross-track seek operation. When the counter contents reaches zero, the counter 104 produces on its BR terminal a pulse signal A indicative of a zero contents in the counter 104, and it informs that the light spot has reached the edge of the target guide groove.

The cross-track pulse generator 202 and cross-track counter 203 shown in FIG. 3 are disclosed in the above-mentioned Japanese Patent Unexamined Publication No. 58-91536, and detailed explanation thereof will be omitted. Although in the circuit arrangement of FIG. 3 the edge signal 53 or 54 is produced each time the light spot goes across the edge of a guide groove and it is used as a cross track pulse, the signal may be produced each time the light spot goes across the center of a guide groove. For inter-groove recording, the track traverse pulse produced when the light spot goes across the center of a guide groove is preferably used as a cross track pulse, while for in-groove recording, the track traverse pulse produced when the light spot goes across the edge of a guide groove is preferably used as a cross track pulse. Although in the circuit arrangement of FIG. 3 the absolute value 55 of the number of tracks to the target track and the access polarity signal 56 indicating the access direction are given separately to conduct the positive edge traverse pulse 54 or negative edge traverse pulse 53 to the UP or DOWN terminal of the counter 104 selectively depending on the access polarity signal, it is also possible to supply the counter 104 with a value SL which contains in combination the absolute value of the number of tracks to the target track and the access direction. For example, by providing a positive value for the inward access and a negative value for the outward access, the positive edge traverse pulse 54 or negative edge traverse pulse 53 is simply applied to the UP or DOWN terminal of the counter 104, and the logic circuit including the logic elements 97–103 become unnecessary.

Figure 4:
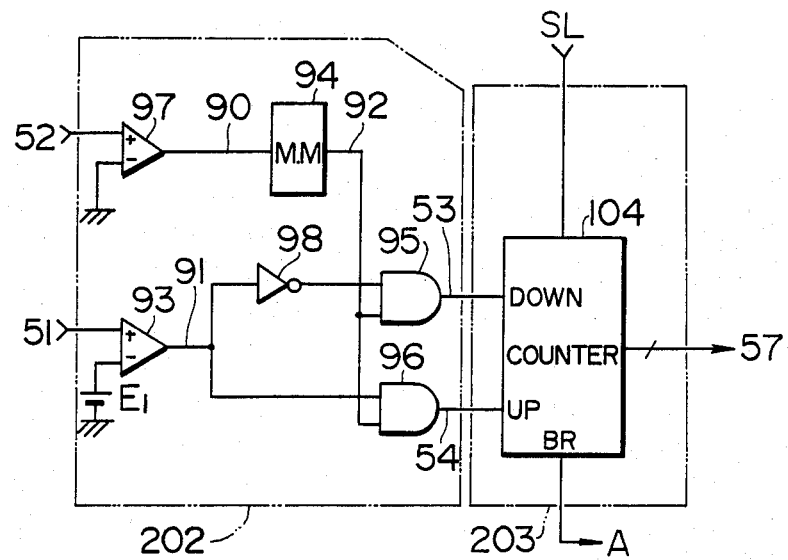
FIG. 4 is a block diagram showing another example of the cross-track pulse detection circuit.

FIG. 4 shows a specific example of the cross track pulse generation circuit 202 which produces a track traverse pulse each time the light spot goes across the center of a guide groove. The tracking signal 52 is compared with a zero level by the comparator 97, which produces a logical "1" level when the input signal is higher than the zero level, or otherwise produces a logical "0" level. This output signal 90 is fed to a monostable multivibrator 94, which produces a pulse with a constant pulse width with reference to the falling edge of the input signal 90. Accordingly, the tracking signal 52 is sampled at a zero level to produce a track traverse pulse 92. The track traverse pulse 92 is received by the input terminals of AND gates 95 and 96, which have their remaining input terminals receiving a track traverse direction signal 91 obtained as a result of comparison of the reflection intensity signal 51 with a voltage level $E_1$ by the comparator 93 and the inverted version of the signal 91 produced by the inverter 98, and have their output terminals providing a down-pulse signal 53 produced each time the light spot traverse the groove center inwardly or an up-pulse signal 54 produced each time the light spot traverses the groove center outwardly, respectively. The up and down pulses 54 and 53 are received by the UP terminal and DOWN terminal of the counter 104 so that it is up-counted or down-counted accordingly. When the counter 104 reaches zero, it produces on its BR terminal a pulse signal A indicative of a zero count in the counter 104.

By using the cross track pulses 53 and 54 derived from the edge traverse pulse or track traverse pulse as described above, the relative speed between the light spot and track on the optical disk, which is necessary for the cross-track seek operation, can be known. For example, in the circuit arrangement of FIG. 5, the negative edge signal 53 is supplied to the frequency-voltage converter 105, and the positive edge signal 54 is supplied to the frequency-voltage converter 106. For a track pitch p and a track traverse speed v, traversing track edges by the light spot produces a pulse train at a frequency f given by the following equation.

$$f = v/p$$

Figure 5:
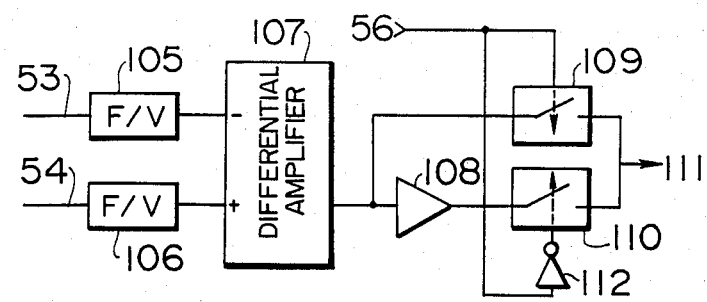
FIG. 5 is a block diagram showing the light spot speed detection circuit.

Accordingly, the track traverse speed by the light spot can be known from the above frequency, and the traverse direction can be known from the sign of the edge signal 53 or 54. Using the sign and the polarity signal 56 of the access direction, the absolute value signal 111 of the speed suitable for the comparison with the target speed signal is produced. The arrangement of the speed detection circuit shown in FIG. 5 is disclosed in the above-mentioned Japanese Patent Unexamined Publication No. 58-91536. For the detection of a speed signal including information on the traverse direction, the output of the differential amplifier 107 can be used.

Next, the procedure for making the timing of switching from the cross-track control (speed control) to the tracking control (position control) will be described. When expressing a tracking error signal as a sinusoidal waveform with the origin located at the target point (zero point of the tracking error signal), the timing (of position control commencement) for a stable operation resides in the range between the positive and negative peaks ($\pm \pi/2$) around the target point, preferably in the linear range on both sides of the origin. In addition, it is necessary for the switching operation to take place at the edge section before the zero point of the target track is passed. In consideration of these factors, it is intended to make outward access to the target track by activating the position servo system after the zero point of the track preceding by one to the target track is passed and immediately after the subsequent positive peak is passed. For making an inward access to the target track, the position servo system is activated after the zero point of the track preceding by one to the target track and immediately after the subsequent negative peak is passed. For the above operation, it is necessary to get the timing signal which imparts the linear range of the target track. For this purpose, the BR output (signal A) of the counter 104 (produced when the counter contents 57 has reached zero), as explained in connection with FIG. 3, is used for the case of the track center located at the center of a guide groove. In another case of the track center located at the center between guide grooves, the BR output (signal A) provided by the counter 104, as explained in connection with FIG. 4, is used.

Figure 6:
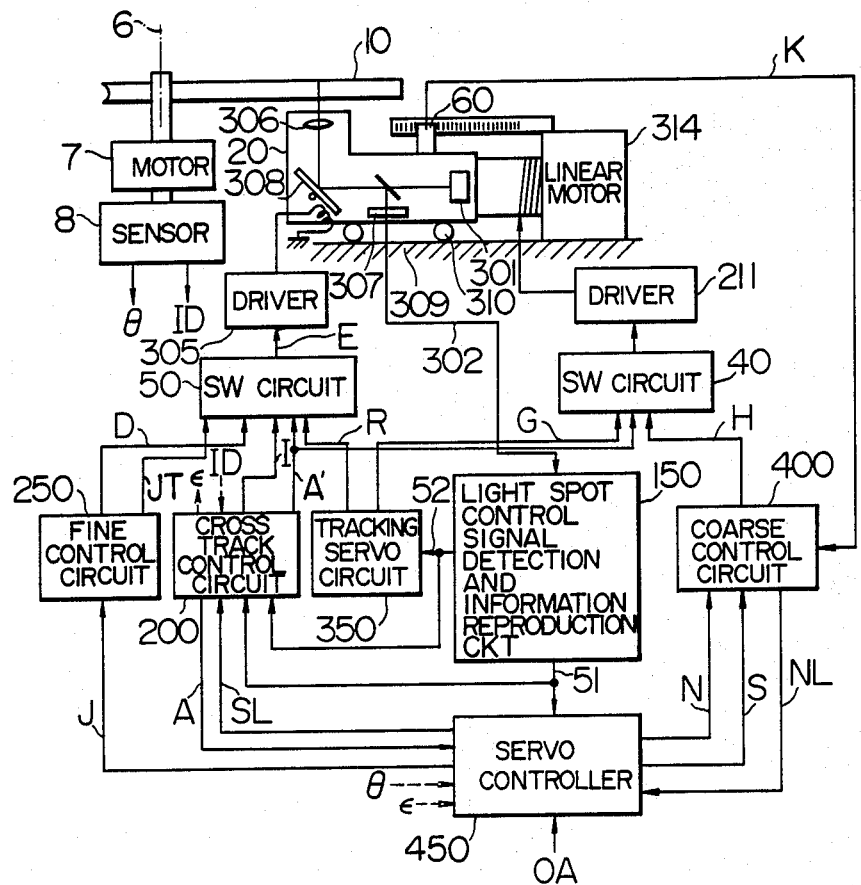
FIG. 6 is a block diagram showing an embodiment of this invention.

Next, the overall system arrangement for implementing the access operation (seek operation) will be described. FIG. 6 shows in block diagram an embodiment of this invention applied to the optical disk storage. The coarse movement mechanism for briefly positioning the light spot across the entire radial range of the disk employs a linear motor which moves the whole optical head, and the high response fine movement mechanism for positioning the light spot in a limited range employs a galvanomirror or pivot mirror mounted on the optical head in this embodiment, although the present invention is not confined to the use of these devices. In the arrangement, the optical disk 10 is rotated around a spindle 6 by a spindle motor 7. A light beam emitted from a light source (semiconductor laser) 301 mounted on the optical head 20 is reflected by a galvanomirror 308, converged by an objective lens 306, and projected onto a track (guide groove 3) on the optical disk 10. The optical head 20 is movable in the radial direction of the disk by means of rollers 310 on a base 309 in response to the traction force exerted by a linear motor 314. The light beam reflected on the optical disk is converted into an electrical signal by a photosensor 307, and the signal is fed to an information reproduction circuit 150, which detects the tracking error signal 52 and reflection intensity signal 51. The reflection intensity signal 51 is used by the servo control circuit 450 to reproduce recorded information (including the header information) recorded on the optical disk. The optical head 20 is provided with an out-focus detection system which produces a focus error signal, but this section unrelated to this invention is not shown nor described here. Such an out-focus detection system is disclosed in U.S. Pat. No. 4,450,547. Among various known methods for detecting the tracking error, the Push-Pull method using the diffraction light, as disclosed in U.S. Pat. No. 4,525,826, is suitably employed.

The tracking error signal 52 is received by a tracking servo circuit 350, which produces a fine tracking control signal R and coarse tracking control signal G. The servo control circuit 450 sets the fine actuator drive mode switch circuit 50 and coarse actuator drive mode switch circuit 40 to the tracking mode, so that the fine tracking control signal R operates on the fine actuator driver 305 to drive the galvanomirror 308 so that the light spot is maintained at the track center. The coarse tracking control signal G operates on the coarse actuator driver 211 to drive the linear motor 314, so that the optical head 20 is moved along the radial direction of the optical disk 10. Thus, the galvanomirror 308 and linear motor 314 operate in unison to implement the tracking operation. This control system is called "two-stage tracking servo system", and is disclosed in the above-mentioned Japanese Patent Unexamined Publication No. 58-91536. The coarse tracking control signal G is obtained through the electrical simulation of the fine tracking control signal R or by directly detecting the deflection angle of the galvanomirror, as disclosed in Japanese Patent Unexamined Publication No. 58-91536.

In this tracking control mode, the servo control circuit 450 receives target address information OA from the host control unit (not shown), and the access operation (seek control) is initiated. The servo control circuit 450 reads the current track address in the reflection intensity signal 51, calculates the amount of coarse seek movement N, and indicates it to the coarse seek control circuit 400. At the same time, the servo control circuit 450 turns off the fine actuator drive mode switch circuit 50, or place it in the lock mode as proposed in the Japanese Patent Application No. 60-54444 (equivalent to U.S. patent application Ser. No. 828353, now U.S. Pat. No. 4,736,353), and sets the coarse actuator drive mode switch circuit 40 to the coarse seek mode. The output H of the coarse actuator control circuit 400 operates on the coarse actuator drive mode switch 40 and coarse actuator driver 211 to drive the linear motor 314, and the optical head 20 is moved fast in the radial direction of the optical disk 10. The coarse seek position signal K for the optical head 20 is detected by the linear encoder 60 and fed back to the coarse seek control circuit 400, and the optical head 20 is positioned to the target of the coarse seek movement. The coarse seek control circuit 400 is given a certain value S from the servo control circuit 450, and when the coarse seek error has become smaller than the value S, the circuit 400 switches the linear motor 314 from the deceleration mode to the settling mode and issues a signal NL indicative of the coarse seek settling operation to the servo control circuit 450. The servo control circuit 450 calculates the number of tracks SL which is the number of tracks counted by the scale pitch S of the linear encoder 60 and modified for the rounding error of the linear encoder, and supplies the result to the cross-track control circuit 200. Furthermore, the servo control circuit 450 sets the fine actuator drive mode switch circuit 50 to the cross-track seek mode. The cross-track control circuit 200 receives the tracking error signal 52 and reflection intensity signal 51 to produce cross-track pulses, and its output I operates on the fine actuator drive mode switch circuit 50 and fine actuator driver 305 to drive the galvanomirror 308 thereby to move the light spot, while counting the number of tracks traversed by the light spot. Accordingly, after the coarse seek operation has entered the settling phase, the galvanomirror 308 and linear motor 314 operate in unison to move the light spot.

Upon issuance of the cross-track seek end signal A by the cross-track control circuit 200 to the servo control circuit 450, the servo control circuit 450 sets the fine actuator drive mode switch circuit 50 and coarse actuator drive mode switch circuit 40 to the tracking mode so as to implement the foregoing two stage servo tracking operation again. The servo control circuit 450 reads the current track address in the signal 51, calculates the amount of fine seek movement J which represents the error with respect to the target address information OA, and supplies the result to the fine seek control circuit 250. Furthermore, the servo control circuit 450 sets the coarse actuator drive mode switch 40 to the tracking mode, and conducts the coarse tracking control signal G to the coarse actuator driver 211. The fine seek control circuit 250 switches the fine actuator drive mode switch circuit 50 between the tracking mode and fine seek mode alternately and produces the track jump pulse signal D when the fine actuator drive mode switch circuit 50 is in the fine seek mode so as to operate on the fine actuator driver 305 to drive the galvanomirror 308 across a single track or several tracks at one time at each jumping so that the light spot is positioned correctly to the target track.

Figure 7:
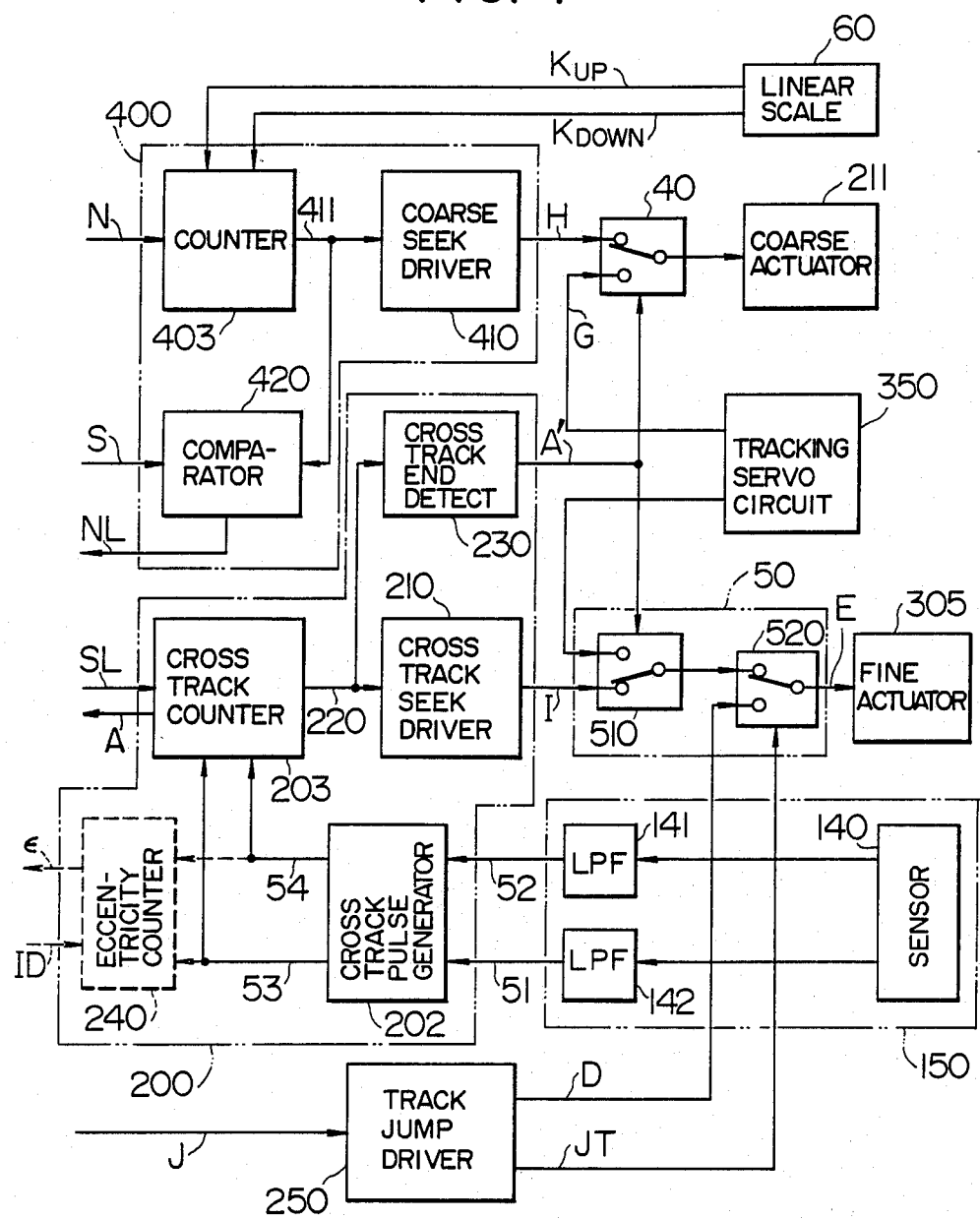
FIG. 7 is a block diagram showing the control circuit in the arrangement of FIG. 6.

The operation of the embodiment shown in FIG. 6 will be described in detail with reference to FIG. 7 which shows in block diagram the control circuit section in FIG. 6. The number of tracks for the movement measured in terms of the scale pitch of the encoder 60, i.e., value N, is written in the coarse seek distance counter 403. For example, when the number of tracks traversed is M=10008, the linear encoder has a scale pitch of L=32 $\mu$m and the track pitch is p=1.6 $\mu$m, the nearest integer of $$\frac{M \times p}{L} = \frac{10008 \times 1.6}{32} = 500.4$$

is N=500, and it is set in the coarse seek distance counter 403. The rounding error E in this example is 0.4.

The coarse seek distance counter 403 is up-counted or down-counted by the up pulse signal Kup or down pulse signal Kdown which is produced depending on the moving direction at each scale pitch of the linear encoder. In response to the coarse seek error 411 contained in the coarse seek distance counter 403, the coarse seek control drive circuit 410 produces the output H, which operates on the switch 40 to drive the linear motor driver 211. At this time, the output of the switch 40 is conducted to the seek side H by being selected by the seek/tracking switching signal A'. The coarse seek control drive circuit 410 is made up of a speed detection circuit, a target speed curve generator, a D/A converter and a differential amplifier. The coarse seek error 411 from the coarse seek distance counter 403 is received by the target speed curve generator, which produces the target speed signal optimal to the error. It is generally known that the optimal speed is desirably in proportion to the root of the remaining distance. In this embodiment, a root table is stored in a ROM so that it provides a digital target speed signal in response to the error 411 with respect to the target position provided digitally by the counter 403. The target speed signal is transformed into an analog signal by the D/A converter, and it is delivered to one input of the differential amplifier. The amplifier has another input receiving the speed signal from the speed detection circuit, and the differential output signifies the difference between the target speed and the actual speed. This is the output H of the coarse seek control drive circuit 410.

As the coarse movement mechanism moves the optical head, the coarse seek error 411 becomes smaller, and when it reaches the predetermined value S, the coarse seek control drive circuit 410 switches the coarse movement mechanism from the deceleration mode to the settling mode. This function is achieved by the speed command characteristics included in the coarse seek control drive circuit 410, but this known technique is not the intent of this invention. Upon detection of the coincidence of the coarse seek error 411 with the value S by the comparator 420, the result NL is indicated to the servo control circuit, which calculates the number of tracks for the value S in terms of the pitch of the scale 60 and the value SL modified for the rounding error E of the pitch of the linear scale, and these values are set in the cross track counter 203. For example, when the linear scale has a pitch of L=32 μm, the optical disk has a track pitch of p=1.6 μm, and the values are given as S=4 and E=0.4, the modified value to be set in the cross track counter 203 is calculated as:

$$SL = \frac{L \times (S + E)}{p} = \frac{32 \times 4.4}{1.6} = 88$$

The outputs of the positioning sensor 140 for detecting the tracking error signal and intensity signal in the output of the photosensor are fed through low-pass filters 141 and 142 so as to eliminate the influence of the header and data signals on the disk, and the resultant signals 52 and 51 are supplied to the cross track pulse generator 202. The cross track counter 203 operates to up-count or down-count in response to the up/down pulse signal 54 or 53 provided by the cross track pulse generator 202 depending on the moving direction of the light spot across the track. In response to the cross track error 220, which is the contents of the cross track counter 203, the cross track seek control drive circuit 210 produces an output I to activate the galvanomirror driver 305 through the switches 510 and 520, thereby moving the light spot to the inherent target of the coarse movement mechanism at high speed. At this time, the output of the switch 510 is connected to the cross track seek side I by the operation of the cross track seek/tracking switching signal A', while the output E of the switch 520 is connected to the output side of the switch 510 by the operation of the track jump switching signal JT. The cross track seek control drive circuit 210 is arranged identically to the coarse seek control drive circuit 410, and is made up of a speed detection circuit, a target speed curve generator, a D/A converter and a differential amplifier. It is of course possible to use the BR output (signal A) from the counter 203 instead of the output A' from the cross track end determination circuit 230.

When the light spot has reached the inherent target of the coarse movement mechanism, with the result of zero cross track error 220, the cross track end determination circuit 230 produces the seek tracking switching signal A' to exchange the connections of the switches 40 and 510. Then, the coarse tracking control signal G and fine tracking control signal R from the tracking servo circuit 350 are applied to the coarse movement mechanism driver 211 and fine movement mechanism driver 305, respectively, and tracking control commences. At this time, the fine movement mechanism is virtually following the eccentricity of the optical disk under the prior cross track control, and therefore time spent for the start-up of the tracking control is not significant. After that, the information read circuit within the servo control circuit reads the current track address to calculate the deviation J from the target track, and the fine seek control circuit (track jump control driver) 250 provides the track jump control signal D and track jump switching signal JT to activate the fine movement mechanism driver 305 so that the light spot is moved to the target track.

In this embodiment, it is possible for the cross track control circuit 200 to correct the eccentricity of the optical disk in the operation of correcting the rounding error E of the linear encoder for the aforementioned small value S. For this purpose, as shown by the dashed line in FIG. 7, an eccentricity counter 240 for detecting the number of eccentric track ε of the optical disk is provided, and the counter 240 is up or down-counted by the up-down pulse 54 or 53. As shown in FIG. 6, the optical disk 10 driven by the spindle motor 7 rotates in an eccentric manner, and the rotational angle sensor 8 provides rotational angle information $\theta$ for the optical disk 10 and a reference angle index signal ID in every revolution. The eccentricity counter 240 is reset at each revolution by the reference angle index signal ID. The number of eccentric tracks e provided by the eccentricity counter 240 and the rotational angle information $\theta$ provided by the rotational angle sensor 8 are delivered to the servo control circuit 450 for the initial several revolutions of the disk, and the average relationship between the amount of eccentricity and rotational angle, i.e., $\epsilon = f(\theta)$, is memorized.

The servo control circuit 450 takes the rotational angle information $\theta$ immediately preceding the seek operation as the initial rotational angle $\theta_1$, and sets the value N which is the number of tracks M traversed expressed in terms of the pitch L of the linear encoder 60 to the coarse seek distance counter 403. Upon detection of the coincidence of the coarse seek error 411 with the small value S in terms of the linear encoder pitch by the comparator 420, the timing signal NL is indicated to the servo control circuit 450. The circuit 450 takes the rotational angle information $\theta$ from the rotational angle sensor 8 as the current rotational angle $\theta_2$, corrects the rounding error E of the linear encoder for the small value S of the cross track counter 203, and writes the number of tracks SL corresponding to the distance modified for the amount of eccentricity of the optical disk. For example, when the linear encoder has a pitch of L=32 μm, the track pitch is p=1.6 μm, the small value is S=4, the linear encoder has a rounding error of E=0.4, the number of eccentric tracks at the initial rotational angle $\theta_1$ is $f(\theta_1)=3$, and the number of eccentric tracks at the current rotational angle $\theta_2$ is $f(\theta_2)=6$, the following value is set in the cross track counter 203.

$$SL = \frac{L \times (S + E)}{p} + f(\theta_2) - f(\theta_1)$$

$$= \frac{32 \times 4.4}{1.6} + 6 - 3 = 91$$

The eccentricity counter 240 for detecting the number of eccentric tracks e may be substituted by the cross track counter 203. In this case, the cross track counter 203 is made accessible for the information 220 by the servo control circuit 450, and the cross track counter 203 is reset at each revolution by the reference angle index signal ID only in the initial eccentricity measurement for the optical disk storage.

FIGS. 8A–8C show in block diagram another embodiment of this invention. The optical head 20 is mounted on the carriage 315, which is moved on the base 309 by means of rollers 310. The carriage 315 is connected to the linear motor 314 through a link 313, and it is driven by the electromagnetic force produced by the magnet 312 and the current flowing in the winding 311. The optical head 20 incorporates an objective lens 306 for forming a light spot on the disk, a galvanomirror 308 as a deflection means for moving the light spot on the disk surface, a photosensor 307 for receiving the reflection beam from the disk surface, a light source, an optical system for conducting a light beam from the light source to the objective lens, and an optical system for conducting the reflection beam to the photosensor, but these components unnecessary for the explanation of this invention are not shown in the figure.

The reflection intensity detected by the optical head 20 is subjected to opto-electric conversion by the photosensor 307, and the produced electrical signal is received by the tracking error signal generator 152 and reflection intensity signal generator 151. The tracking error signal generator 152 produces a tracking error signal 52, while the reflection intensity signal generator 151 produces a reflection intensity signal 51. These signals 52 and 51 are fed to the cross track pulse generator (edge signal generator) 202 which produces a positive direction edge signal 54 and negative-direction edge signal 53. The positive and negative-direction edge signals 54 and 53 are received by the differential counter 203 for calculating the difference between the current position and the target track and the speed detection circuit 204, which produce the absolute value signal 57 representing the distance to the target track and the absolute value signal 111 representing the speed. The target track distance signal 57 is received by the target speed curve generator 205, which produces a speed signal optimal to the current position. It is generally recognized that the optimal speed is desirably proportional to the root of the distance to the target track. In this embodiment, a root table is stored in a ROM so that a target speed signal 206 is read out digitally in accordance with the absolute value signal 57 representing the distance to the target track which is given digitally by the counter 104. The target speed signal 206 is fed to the D/A converter 207 so that it is transformed into an analog signal, and the output is supplied to one input of the differential amplifier 208. The amplifier 208 has another input receiving the absolute value signal provided by the speed detection circuit 204. The differential output produced by the amplifier 208 is received by the polarity inversion circuit 209. The circuit 209 provides a sign for the absolute differential speed signal depending on the logical level of the access polarity signal 56. Accordingly, the output represents the difference with the sign between the target speed and the actual speed, and it is delivered to the cross track seek (speed control)/tracking control (positioning control) switching circuit 51 and controlled by the timing signal B for the commencement of position control. Namely, the timing signal B at a low level selects the speed control for cross track seeking, causing the differential speed signal to appear at the output E' of the switching circuit 51, and the output E' is added to the jump signal D as will be described later by the adder 53 to produce a signal E. The signal E operates on the galvanomirror drive circuit 305 to drive the galvanomirror 308. When the speed control for cross track seeking completes and the light spot reaches the target track, the timing signal B becomes high, and the mode is switched to the tracking position control. In the tracking control, the tracking error signal 52 is received by the switch circuit 311, and it is delivered to the phase compensation circuit 312 under control of the timing signal B at a high level. The circuit 312 provides its output to the switching circuit 51. In this way, the timing signal B initiates the tracking control, and the light spot is pulled to the target track stably. The tracking error signal 52 is received together with the access polarity signal 56 and signal A by the timing circuit 214 which produces the timing signal B.

These are the access operation for the galvanomirror. The following describes the control method for the coarse actuator. The high-response galvanomirror has a narrow operating range, and it is necessary to operate the coarse actuator by detecting the operation of the galvanomirror. The signal E' for driving the galvanomirror is fed to the circuit 300 which simulates the frequency response of the galvanomirror so as to detect the movement of the galvanomirror, i.e., the displacement of the galvanomirror from the preset neutral point, and the detected signal F is used to control the coarse actuator. In FIG. 8, the signal F is fed to the phase compensation circuit 310 which stabilizes the coarse actuator control system, and its output G is supplied to the linear motor drive circuit 211 to drive the linear motor. In consequence, the galvanomirror and coarse actuator can operate in unison in both cross track seeking (speed control) and tracking (position control). As a method of detecting the displacement of the light spot from the sight of lens, there is known a method of detecting directly the deflection angle of the mirror, besides the foregoing electrical simulation using the mirror drive signal E'. This method can be carried out, for example, using a light emitting diode as proposed in Japanese Patent Unexamined Publication No. 58-91536, or using a magnetic sensor. The circuit 335 is to detect the deflection angle of the mirror, and it produces an output signal F'. Such a direct detection method for the mirror deflection angle is operative to sense the mirror movement caused by the mechanical vibration, and it provides an accurate coarse actuator control signal. An embodiment using the signal F' as a result of direct detection of the mirror deflection angle as described above is shown in FIGS. 9A–9C. The functional blocks in FIGS. 9A–9C identical to those in FIG. 8 are referred to by the common symbols. The arrangement differs from that of FIG. 8 in that the phase compensation circuit 310 receives the direct measurement signal F' for the galvanomirror deflection angle instead of the signal F representing the displacement of the galvanomirror from the set point, and the drive circuit 211 receives the drive signal G' for the coarse actuator. It is also possible to detect the signal F' by provision of a photosensor or magnetic sensor, as disclosed in Japanese Patent Unexamined Publication No. 58-91536, on a 2-dimensional or 3-dimensional actuator used in home appliances, in place of the galvanomirror.

Tracking on the target track takes place as described above, and address information recorded on the track is read out. The explanation for the address readout means is omitted in this embodiment. The readout information is delivered to the controller (not shown), which tests whether the current track is the target track. The controller mentioned above is a control unit used in a magnetic disk unit and the like, which controls a drive unit including a drive mechanism and its drive circuit for reading and writing data. (The drive unit has been described in detail in this specification.) In the access operation, the controller receives an intended track number from a host computer, compares it with the current track number, calculates the number of tracks to the intended track and the direction, and sends the result to the drive unit. When the drive unit implements the speed control and position control by itself and begins to read data on the intended track and neighboring tracks, the controller analyzes the data to find the current track number and determines the following access procedure. For example, when the data contains a number-of-jump signal J indicating one track, and the disk has a spiral record, the controller issues a jump polarity signal indicating the jump direction from outside to inside. The number-of-jump signal J is received by the jump initiation circuit 251, which sends a jump polarity signal to the jump waveform generator 252 and, at the same time, produces jump pulses equal in number to the given number of jumps at a specified time interval. Receiving the pulse the jump waveform generator 252 produces the drive signal D for making a jump in accordance with the jump polarity signal. In order to read the data constantly upon arrival at the target track, the controller produces the number-of-jump signal J including a signal indicative of a single jump and a jump polarity signal indicative of the inward jump in each revolution of the device. In case the access operation has completed and the position-controlled track is found different from the target track as determined from the readout address, the light spot is moved to the target track through the jump operation provided that the difference between the current track and the target track is smaller than a preset value (e.g., 64 or 128). At this time, the controller issues the number-of-jump signal J including the number of tracks to the target track and the jump direction. If the difference from the target track is larger than the preset value, the access operation including the speed control is initiated. This is the repetition of the access procedure described above.

By the basic arrangement of the access operation described above, i.e., determining as to whether the light spot traverses a track inwardly or outwardly on the disk from the reflection intensity signal and the tracking error signal, the error caused by the eccentric rotation and mechanical vibration is reduced. The relative speed between the light spot and track is measured accurately by using the signal which is produced when the light spot traverses a track.

There are known means for making the light spot highly responsive in a small range of distance, such as a deflector using a piezoelectric device and the acoustic-optical effect, and a deflector using the electro-optical effect. Also in these cases, the movement relationship between the drive input to the deflector and the light spot is measured in advance and the electrical simulation is conducted so as to produce the signal for controlling the coarse actuator. Alternatively, this control signal may be produced by detecting the movement of the light spot directly.

As described by the present applicant in Japanese Patent Unexamined Publication No. 58-91536, it is possible to combine the method for a large distance access in which the fine actuator is fixed and only the coarse actuator is used for the movement with the method for a small distance movement (e.g., shorter than 100 tracks) in which the fine and coarse actuators operate in unison to make a jump operation. Namely, for a large distance (e.g., 100 tracks or more), the fine actuator is fixed so that it does not vibrate due to the acceleration and deceleration of the coarse actuator, while for a small distance (e.g., few tracks to 100 tracks), the light spot is moved by the fine actuator while detecting tracks traversed and its direction and the coarse actuator is operated to follow the movement of the fine actuator, as in the case of this embodiment. The light spot is positioned within the range of few tracks through the jump operation.

It is also possible to combine this embodiment with the access method proposed by the present applicant in the aforementioned Japanese Patent Unexamined Publication No. 58-169370. In this case, an external coarse positioning scale is used for implementing coarse positioning, and thereafter fine positioning takes place in the jump operation. An external scale is used for the coarse positioning, and for a small distance access, the fine actuator is operated to move the light spot while detecting tracks traversed and its direction and the coarse actuator is operated to follow the movement of the fine actuator, as described in the above embodiment.

In detecting the cross track pulses 53 and 54, it is necessary to make the tracking error signal 52 and reflection intensity signal 51 into pulses. However, the reflection intensity signal 51 has an inaccurate slicing level due to the variation of the optical disk reflectivity in the radial direction, the variation in the recording/reproduction laser output, and the variation in the a.c. and d.c. levels of the reflection intensity signal among optical disks, and therefore the number of tracks cannot be counted correctly and the light spot cannot be positioned correctly to the target track in some cases. It is required to obtain the cross track pulses stably and reliably even if the reflectivity of the optical disk varies in the radial direction, the recording/reproduction laser output varies or the optical disk is replaced.

In the case of two-stage positioning including the coarse seek and fine seek operations, the cross track movement is little, and the requirement for making the total reflection intensity signal into pulses correctly is to know the slice level of the reflection intensity signal in the neighborhood of the cross tracking position. The a.c. level and d.c. level of the reflection intensity signal for determining the slice level of the reflection intensity signal cannot be observed unless the light spot traverses a track, and therefore they cannot be obtained in the usual state of tracking. On this account, these values are determined from the a.c. level and d.c. level of the reflection intensity signal in the neighborhood of the brief positioning end point by the coarse movement mechanism.

Figure 10:
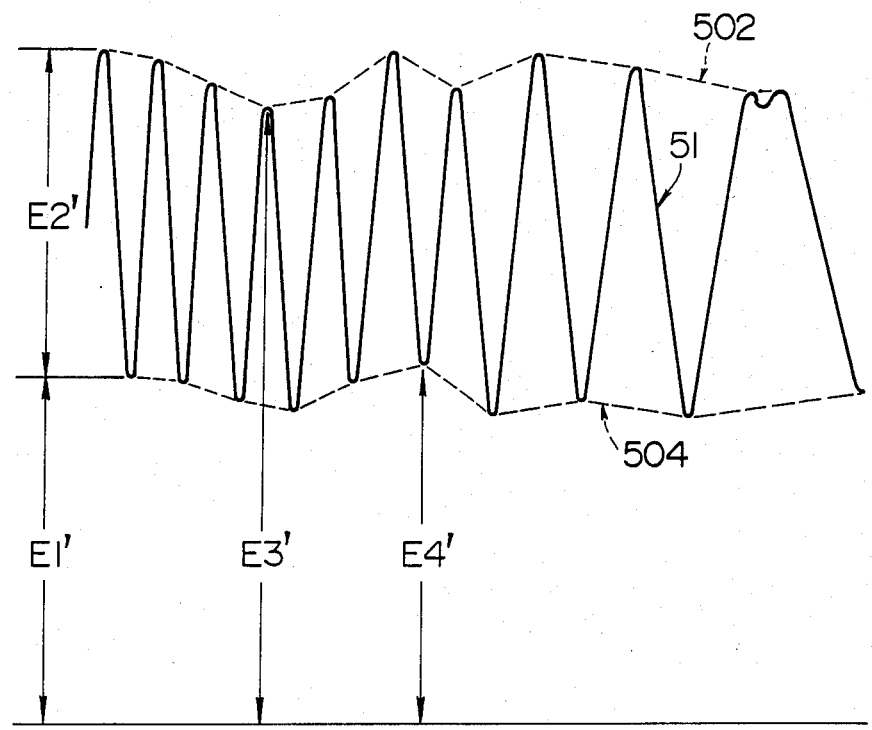
FIG. 10 is a diagram used to explain the method of determining the slice level of the reflection intensity signal.

The following describes the method of determining the slice level $E_1$ of the reflection intensity signal 51 in connection with FIG. 10. The reflection intensity signal 51 produced by the light spot positioning sensor and fed through the low-pass filter has a varying d.c. level $E_1$, and an a.c. level $E_2$, in super-imposition, and it is generated in a sinusoidal waveform each time the light spot traverses a track. The low-band (frequency) reflection intensity signal 51 in the neighborhood of the coarse seek end point develops an upper envelope signal 502 and a lower envelope signal 504, and these signals are further processed to evaluate the minimum value $E_3'$ of the upper envelope signal 502 and the maximum value $E_4'$ of the lower envelope signal 504. The slice level $E_1$ for the reflection intensity signal 51 is obtained as a center value $E_5'$ between the minimum value $E_3'$ and maximum value $E_4'$.

Figure 11:
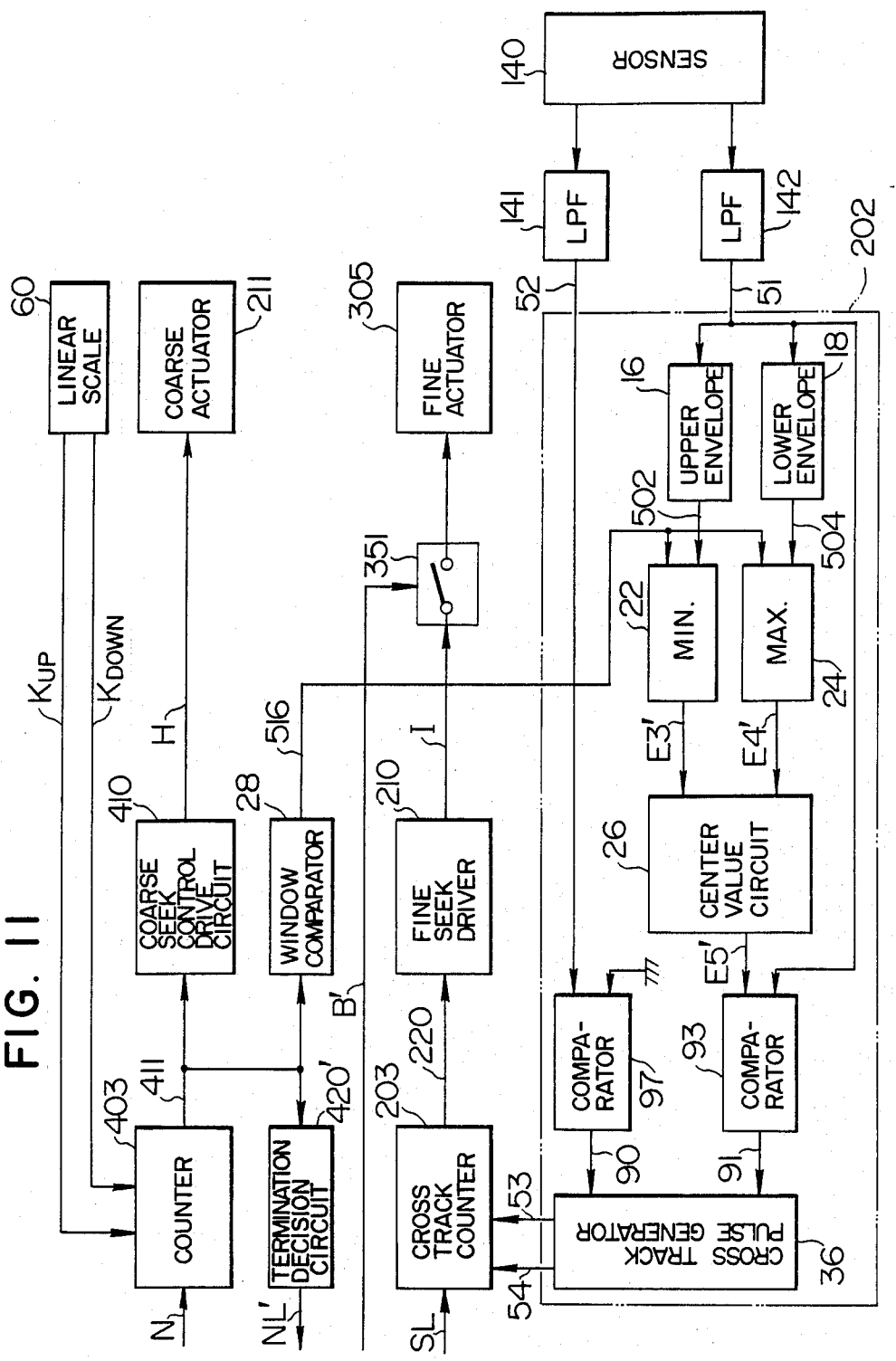
FIGS. 11 and 12 are block diagrams used to explain the method of determining the slice level of the reflection intensity signal.

FIG. 11 shows a specific circuit arrangement for implementing the above process. The tracking control system and fine seek control system (jump control system) are omitted in FIG. 11. The tracking error signal and reflection intensity signal provided by the light spot positioning sensor 140 are fed through the low-pass filters 141 and 142, which eliminate the influence of the header and data signals recorded on the disk, and become a low-band tracking error signal 52 and a low-band reflection intensity signal 51. The upper envelope circuit 16 and lower envelope circuit 18 produce an upper envelope signal 502 and lower envelope signal 504, respectively, from the low-band reflection intensity signal 51.

The coarse movement mechanism operates to move the light spot to the vicinity of the coarse seek target, the window comparator 28 detects that the coarse seek error 411 has become between predetermined values $\alpha_1$ and $\alpha_2$ ($\alpha_1 > \alpha_2$), the detection output 516 operates on the minimum value circuit 22 and maximum value circuit 24 to evaluate the minimum value $E_3'$ of the upper envelope signal and the maximum value $E_4'$ of the lower envelope signal 504, and the center value circuit 26 evaluates the center value $E_5'$ between the minimum value $E_3'$ and maximum value $E_4'$, which is the slice level for the reflection intensity signal.

When the coarse seek error 411 falls below the value $\alpha_2$, causing the termination decision circuit 420' to determine the end of movement of the coarse movement mechanism, the decision output NL' is sent to the host control unit, and the tracking controller (not shown) implement a temporary tracking for the light spot and the current track address is read. The host control unit calculates the deviation SL from the target track, the result is set in the cross track counter 203, the switch 351 is closed by the signal B' from the host control unit, and the cross track operation is commenced.

The low-band tracking error signal 52 is zero-level sliced by the comparator 97 to become a pulse signal 90, while the low-band reflection intensity signal 51 is $E_5'$-level sliced by the comparator 93 to become a pulse signal 91, and both pulse signals are supplied to the cross track pulse generator 36. In response to the up-/down pulse signal 54 or 53 provided by the cross track pulse generator 36 depending on the moving direction of the light spot against the track, the cross track counter 203 is up-counted or down-counted accordingly. The foregoing embodiment is capable of stable and reliable cross track seek operation up to the target track even if the optical disk has a varying reflectivity in the radial direction, the recording/reproduction laser has a varying output, or the optical disk is replaced.

Next, another method for determining the slice level $E_1$ for the reflection intensity signal 51 will be described. In making the reflection intensity signal into pulses, one of the upper and lower envelopes of the reflection intensity signal nearer to the average level of the reflection intensity signal during tracking is provided, and after it is subtracted from the reflection intensity signal the signal is made into pulses at a slice level lower than the minimum amplitude of the reflection intensity signal. The light spot is moved in cross track seek mode, and determination of moving direction by the reflection intensity signal is conducted only after the error to the target becomes smaller than a certain preset value. Since the reflection intensity signal is most attenuated when the light spot is located within the tracking groove of the disk, the optical disk unit designed to make tracking in the groove has the average level of the reflection intensity signal during tracking nearer to the lower level of the reflection intensity signal during cross tracking. On this account, when the signal is produced through the subtraction of the reflection intensity signal by detecting the lower envelope of the reflection intensity signal during cross tracking, the signal having its lower envelope always coincident with the zero level can be obtained regardless of the d.c. level of the reflection intensity signal. By slicing this at a positive slice level lower than the minimum amplitude of the reflection intensity signal, the influence of the amplitude and d.c. level of the reflection intensity signal can be eliminated.

Conversely, the optical disk unit designed to make tracking between adjacent grooves has the average level of the reflection intensity signal during tracking nearer to the upper level of the reflection intensity signal during cross tracking. On this account, when the signal is produced through the subtraction from the reflection intensity signal by detecting the upper envelop of the reflection intensity signal during cross tracking, the signal with its upper envelop always coincident with the zero level can be obtained regardless of the d.c. level of the reflection intensity signal. By slicing this signal at a negative slice level lower than the minimum amplitude of the reflection intensity signal, the influence of the amplitude and d.c. level of the reflection intensity signal can be eliminated.

If the deviation from the target is large during the movement in the cross track seek mode, the drive signal has an invariable polarity, the relative speed between the light spot and track is high, and the moving direction at the commencement of movement is retained, and therefore the determination of the moving direction may be omitted. As the deviation becomes smaller, causing the absolute speed of the light spot to fall, the relative moving direction between the light spot and track can possibly reverse due to the eccentricity of the optical disk. In such an operating range, the reflection intensity signal has a lower frequency, and it is not restricted by the frequency band of the servo signal system, and therefore the amplitude of the reflection intensity signal does not fall. On this account, the determination of the moving direction by the reflection intensity signal is conducted only after the deviation has become smaller than a certain preset value, and the light spot can be positioned correctly to the target track.

Figure 12:
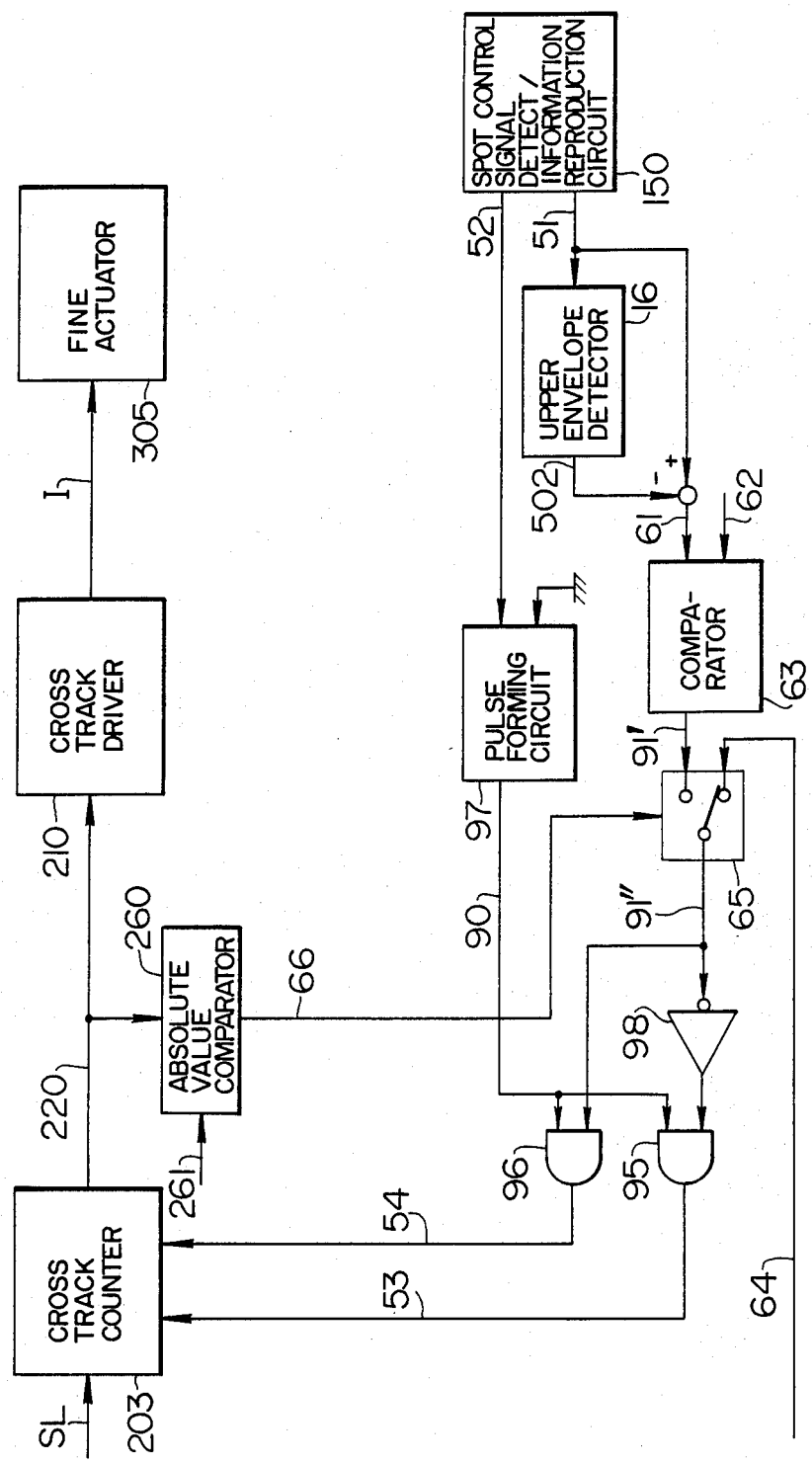

This operation will be described in detail in connection with FIG. 12. This embodiment is an optical disk unit designed to track between adjacent grooves. In FIG. 12, the light spot position detection circuit 150 provides a tracking error signal 52 and reflection intensity signal 51. The tracking error signal 52 is made into a track cross pulse signal 90 at a zero slice level by the pulse forming circuit 97. The upper envelope detection circuit 16 produces an upper envelope signal 502 from the reflection intensity signal 51, it is subtracted from the reflection intensity signal 51 to produce a reflection intensity signal 61 with a stabilized level. The level-stabilized reflection intensity signal 61 is made into pulses at a negative slice level lower than the minimum amplitude of the reflection intensity signal set by the comparator 63, and a moving direction signal 91' is produced. The moving direction signal 91' and the initial moving direction signal 64 are selected by the switch 65 in accordance with the selection signal 66, and a direction signal 91" is obtained. The track cross pulse signal 90 is divided into an up pulse signal 54 and down pulse signal 53 by the gate circuits 95 and 96 which receive the direction signal 91" and its inverted version through the inverter 98, and these signals are used to up-count or down-count the cross track counter 203.

A cost control unit (not shown) provides an initial moving direction signal 64 and number of tracks traversed SL, and these values are set in the cross track counter 203. The absolute value of the cross track deviation 220 contained in the track counter 203 is compared with a preset value 261 by the absolute-value comparator 260. The absolute value of the cross track deviation 220 is larger than the preset value 261 at starting, and therefore the selection signal 66 produced by the absolute-value comparator 260 connects the switch 65 to the side of the initial moving direction signal 64. In response to the cross track deviation 220, the output I of the cross track control drive circuit 210 drives the light spot positioning mechanism driver 305 so that the light spot is moved toward the target track at high speed. The cross track counter 203 is simply up-counted or down-counted depending on the moving direction, and the absolute value of the cross track deviation 20 decreases. When the absolute value of the cross track deviation 220 becomes smaller than the preset value 261, the selection signal 66 connects the switch 65 to the side of the moving direction signal 91'. Consequently, the cross track counter 203 is up-counted or down-counted depending on the relative moving direction between the light spot and track. In case the light spot passes over the target track, the relative moving direction and the counting polarity will reverse, causing the cross track deviation 220 to fall to zero, and the light spot is positioned correctly to the target track.

Although the foregoing embodiment is an optical disk unit designed to track between adjacent grooves, the similar arrangement can be made for an optical disk unit designed to track over the groove. In this case, the lower envelope detection circuit 18 is used instead of the upper envelope detection circuit 16 to produce the lower envelop signal 504, it is subtracted from the reflection intensity signal 51, and the level-stabilized reflection intensity signal 61 is produced. The level-stabilized reflection intensity signal 61 is made into pulses at a positive slice level lower than the minimum amplitude of the reflection intensity signal which has been preset by the comparator 63, and the moving direction signal 91' is obtained.

Figure 13:
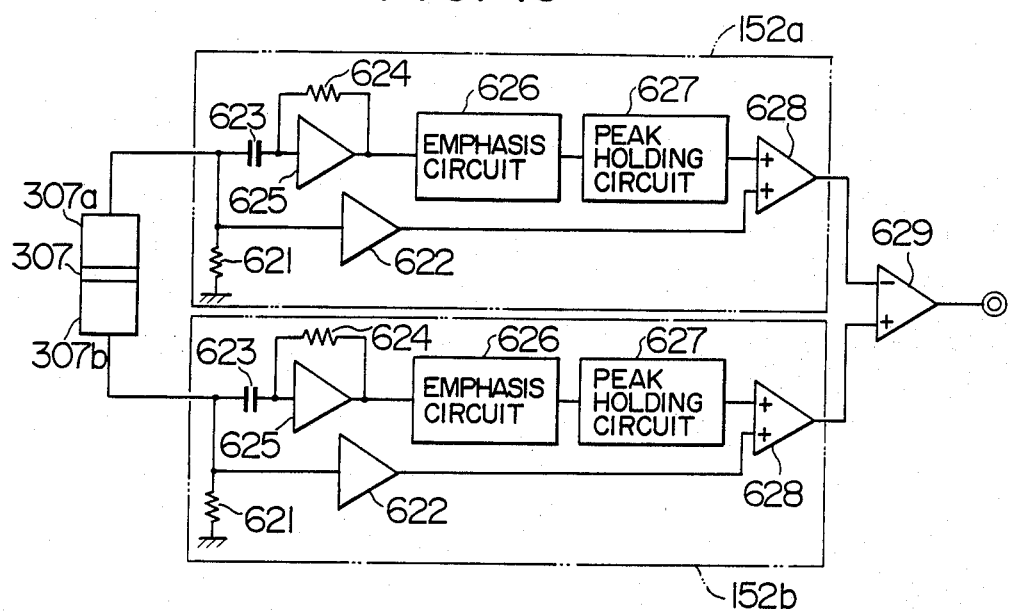
FIG. 13 is a diagram used to explain the off-track detection circuit.
Figure 14:
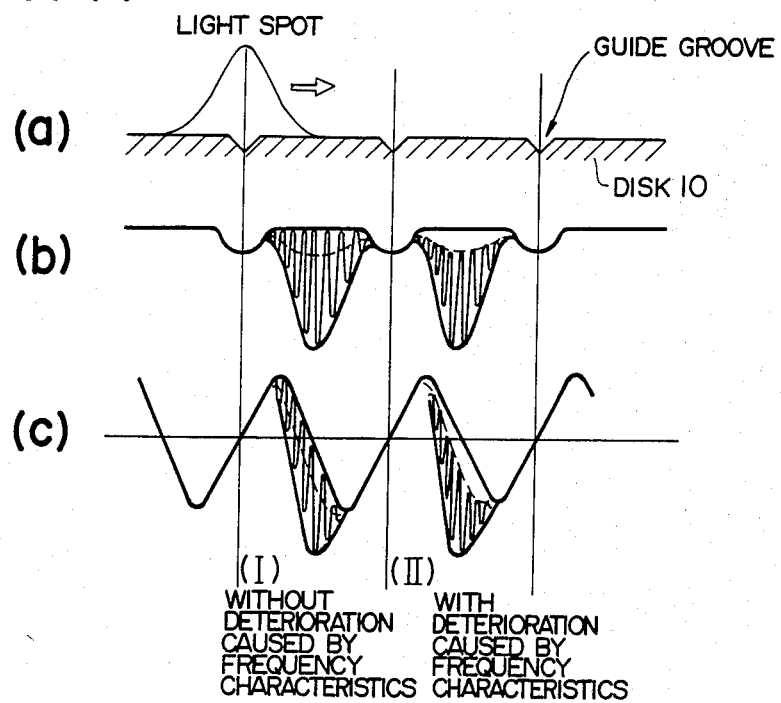
FIG. 14 consisting of parts a-c is a diagram used to explain the effectiveness of the emphasis circuit.
Figure 15A:
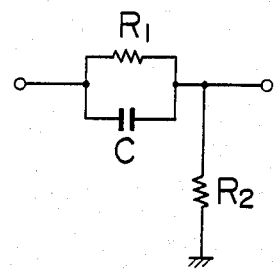
FIGS. 15A and 15B are diagrams explaining the arrangement of the emphasis circuit.
Figure 15B:
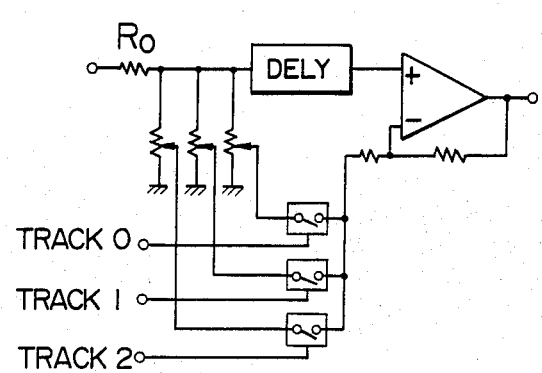
Figure 16:
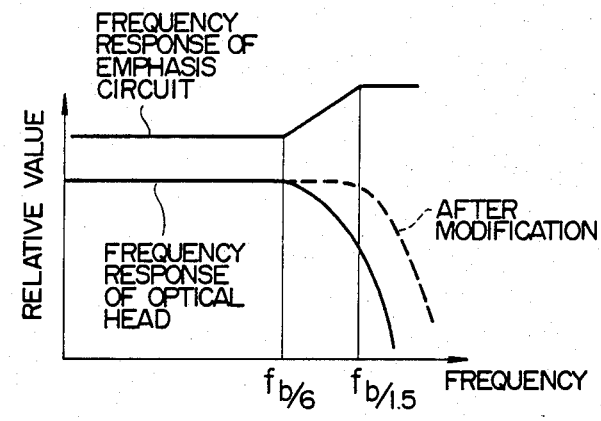
FIG. 16 is a diagram used to explain the frequency response of the optical head and the emphasis circuit.

Next, an example of the tracking error detection circuit 152 will be described using FIG. 13. The circuit 152a for the output of one element 307a of the split photosensor 307 and the circuit 152b for the output of another element 307b are identical, and the following describes only the circuit 152a. The output of the element 307a is subjected to current-voltage conversion by the resistor 621, and after its d.c. component has been blocked by the low-band amplifier 622 and capacitor 623 the signal is applied to the high-band amplifier 625 having a feedback resistor 624. The output of the high-band amplifier 625 is processed by the emphasis circuit 626 and peak holding circuit 627, and it is added to the output of the low-band amplifier 622 by the adder 628. The outputs of the circuits 152a and 152b are fed to the differential amplifier 629, and a track error detect signal is produced. The effects of the emphasis circuit and peak holding circuit will be described using FIG. 14. In FIG. 14, waveform (a) shows the relationship between the light spot and guide groove 3 on the disk 10, waveform (b) shows a record of information made between grooves by the circuits 152a and 152b, and waveform (c) shows the output of the differential amplifier 629. The left-hand waveform (I) shows the case where the mixing information signal has no decay in the frequency characteristics, while the right-hand waveform (II) shows the case of a decay in the frequency characteristics. In the case of (I), the emphasis circuit is not required, and the peak holding circuit is required. If the peak holding circuit is absent, the waveform will become as shown by the dashed line, with the result of a varying guide groove level in (b) and a falling tracking error detect signal amplitude in (c). The above problems can be solved by use of the peak holding circuit. However, if deterioration in the frequency characteristics occurs as in (II), the guide groove level will vary and the tracking error detect signal amplitude will fall even if the peak holding circuit is used. The emphasis circuit can be arranged using a phase-lead circuit or cosine equalizing circuit as shown by FIG. 15A and FIG. 15B. In the case of FIG. 15B, the optical disk has the frequency characteristics which vary largely in an inner section and outer section on the disk, and the degree of emphasis can be optimized by varying the gain for the inner and outer sections with reference to the track address so as to modify the uneven frequency characteristics. FIG. 16 shows the relationship between the optical frequency characteristics of the optical disk and the frequency characteristics of the emphasis circuit. Depending on the degree of the falling frequency of the information signal (e.g., for a bit frequency of $f_b$ in 2-7 modulation system, it ranges $f_b/1.5$ to $f_b/6$), the gain and raising frequency ($f_0/6$ in this example) for the emphasis circuit are set. Using such an emphasis circuit, the amplitude reduction of the information signal due to the frequency characteristics can be corrected in the case (II) of FIG. 14, and the variation of the guide groove level and the reduction of the tracking error detect signal amplitude can be prevented as shown by the bold solid line, whereby stable tracking can be implemented.

Figure 17:
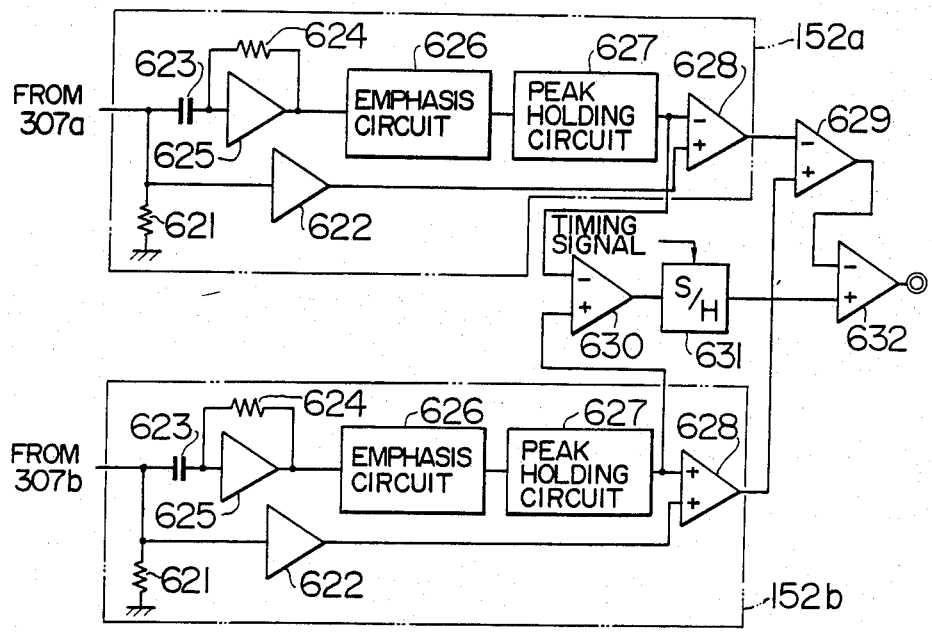
FIG. 17 is a block diagram showing another embodiment of the off-track detection circuit.

FIG. 17 shows the case employing the mirror surface offset system which correct the offset occurring in the tracking error detect signal due to the inclination of the disk by a mirror surface section provided in the guide groove, as described in Japanese Patent Unexamined Publication No. 59-19250 (equivalent to U.S patent application Ser. No. 515,520, filed on July 20, 1983 now U.S. Pat. No. 4,663,751). The basic arrangement is identical to that shown in FIG. 13, and the level of the mirror surface section including the disk inclination information appearing in the tracking error detect signal is detected by the differential amplifier 630 which receives the outputs of the circuits 152a and 152b by utilization of the outputs after the peak holding circuit on the side of the high-band amplifier. Thereafter, only the mirror surface section level is detected by the sample-holding circuit 631 using the timing signal for detecting the mirror surface section made from the information signal, and, after the gain adjustment for the output of the differential amplifier 629 for the tracking error detect signal and the output of the sample-holding circuit 631, the signals are fed to the differential amplifier 632 to obtain the tracking error detect signal which is corrected for the offset due to the disk inclination.

Figure 18:
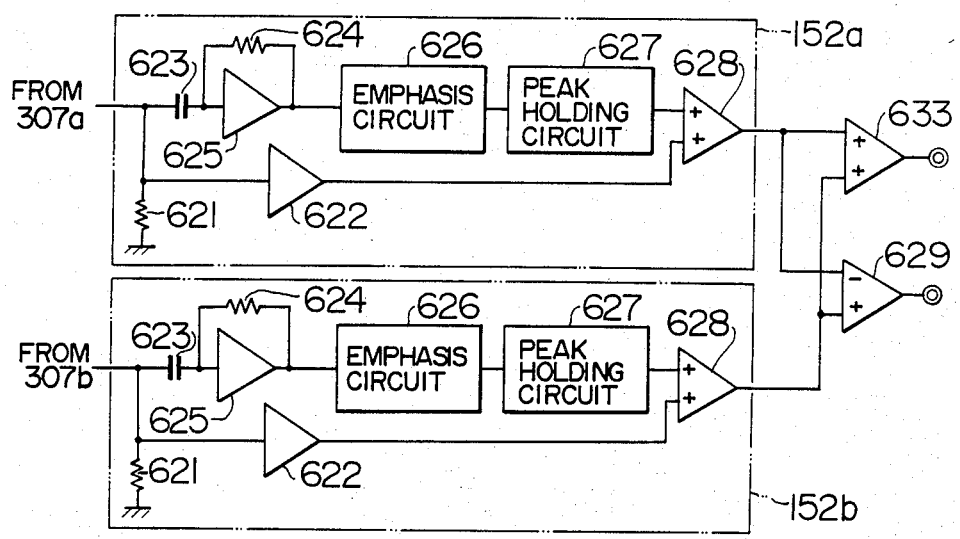
FIG. 18 is a block diagram showing still another embodiment of the off-track detection circuit.

FIG. 18 shows the case of adopting the cross track count system. The basic arrangement is identical to FIG. 13, but in this case the guide groove level (reflection intensity) signal 51 used for the direction discrimination is produced by adding the outputs of the circuits 152a and 152b by the adder 633. This signal causes the guide groove level (reflection intensity) signal to vary when the coexistent information signal decays in the frequency characteristics, as has been explained on FIG. 14, particularly the variation increases in intergroove recording, resulting in problems such as the occurrence of erroneous cross track counting. However, employment of the emphasis circuit stabilizes the guide groove level signal, allowing the access operation by the method of the stable cross track count system.

Although in the above description a low-band amplifier and a high-band amplifier are used as a virtual high-band d.c. amplifier in the tracking error detection circuit with the assumption that the cutoff frequency $f_{c1}$ of the low-band amplifier is equal to the low-band cutoff frequency $f_{c2}$ of the high-band amplifier, the same effect will obviously be reached when a single high-band d.c. amplifier is used. Although the Push-Pull method has been described for tracking error detection, other methods (e.g., 3-spot method) will accomplish the same effect, and the same result will be reached for a recording/reproduction unit or a dedicated reproduction unit. In the reproduction unit adopting the 3-spot method, a high-band amplifier may be combined with an emphasis circuit and a peak holding circuit.

According to this invention, as described above, the signal deterioration due to the frequency characteristics of the information signal coexistent in the tracking error detect signal is recovered using the emphasis circuit, whereby stable tracking and light spot access are made possible.

We claim:

1. An optical disk access method for positioning a light spot emitted from an optical head to an intended track of a plurality of tracks on said optical disk by using a coarse actuator and a fine actuator, said course actuator being utilized for moving said optical head and said fine actuator being mounted on said optical head and utilized for moving said light spot emitted from said optical head, comprising the steps of:
generating pulses by using an external scale so that a pulse is produced each time when said light spot moves one pitch of said scale;
measuring the number of pitches of said scale representing a difference between a track on which said light spot is located and a target track by counting said pulses;
driving said coarse actuator depending on said measured number of pitches;
generating a pulse track each time when said light spot has traversed a track;
measuring the number of tracks representing a difference between a track on which said light spot is located and said target track by counting said track pulses;
driving said fine actuator when the moving operation by said coarse actuator has brought said light spot to a position short of a certain distance from a target of operation; and
operating said fine and coarse actuators in unison so that said light spot is positioned to the intended track.

2. An optical disk access method according to claim 1, comprising the steps of:
detecting the operation of said fine actuator; and controlling said coarse actuator in response to a signal as a result of said detection so that said fine and coarse actuators are operated in unison.

3. An optical disk access method according to claim 1, wherein the track pulse generated when said light spot traverses the track is detected from a track deviation error signal and a light quantity signal.

4. An optical disk access method according to claim 3, wherein a value of a slice level required to form the track pulse using said light quantity signal is determined based on values of an AC level and a DC level of said light quantity signal.

5. An optical disk access method according to claim 3, wherein the track pulse is formed by obtaining an envelope which is close to an average level from an upper side envelope and a lower side envelope of said light quantity signal, and by substracting an obtained envelope from said light quantity signal.

6. An optical disk access method according to claim 1, wherein said fine actuator is driven according to an amount of eccentricity of the optical disk.

7. An optical disk access method wherein a seek operation for positioning a light spot on a target track on an optical disk is carried out by performing a coarse seek operation by a coarse movement mechanism and a fine seek operation by a fine movement mechanism mounted on said coarse movement mechanism, comprising the steps of:
moving the light spot across tracks toward a target position by the coarse movement mechanism in the coarse seek operation;
moving the light spot by the fine movement mechanism based on a count of the number of tracks traversed by the light spot when the coarse seek operation has brought the light spot to a position short of the target position so that the light spot is positioned to the target position by operating the fine movement mechanism and the coarse movement mechanism in unison;
performing a tracking operation;
detecting a deviation from a target track by reading a track address of the position; and
positioning the light spot for recording and reproducing on the target track by repeating jump operations by the fine movement mechanism in accordance with the deviation.

8. An optical disk access method wherein a seek operation for positioning a light spot for recording and reproducing on a target track on an optical disk with tracks is performed by a coarse seek operation of a coarse movement mechanism and a fine seek operation of a fine movement mechanism, comprising the steps of:

moving the coarse movement mechanism to reach a position a minute amount before a target position of the coarse seek operation while making reference to a position detector for coarse seeking;

moving the fine movement mechanism by the number of tracks corresponding to a distance corrected by a rounding error of the position detector for coarse seek and an amount of eccentricity of the optical disk while counting the number of tracks traversed by the light spot so that the fine movement mechanism and the coarse movement mechanism operate in unison;

performing a tracking operation;

detecting a deviation to the target track by reading a track address at that position; and positioning said light spot on the target track by performing a position modification by said fine movement mechanism in accordance with the deviation.

9. An optical disk storage accessing apparatus comprising:

an optical head which projects a light spot onto an optical disk having tracks;

a coarse actuator for moving said optical head;

a fine actuator provided on said optical head for moving said light spot;

an external scale means for generating a pulse in response to movement of said optical head by said coarse actuator for each pitch of said scale means;

first means for determining the number of tracks representing a difference between the present track on which said light spot is located and a target track;

second means for calculating the distance between the present track and the target track in pitches of said scale means;

third means for counting pulses of said scale means and for generating a control signal for driving said coarse actuator in accordance with the number of pitches of said scale means corresponding to a difference between the present track and the target track;

fourth means for determining when the number of pitches of said scale means becomes less than a predetermined value;

fifth means for calculating the number of tracks between the track on which said light spot is located and the target track;

a light spot position detection means for generating a pulse each time said light spot traverses a track; and sixth means responsive to said fourth means for counting pulses of said light spot position detection means and for producing a control signal for driving said fine actuator depending on the number of tracks determined by said fifth means so that said coarse actuator and said fine actuator operate with each other and operate in unison.

10. An optical disk storage accessing apparatus according to claim 9, wherein said light spot position detection means includes a track deviation detection circuit and a reflected light quantity detection circuit, and said track deviation detection circuit includes an emphasis circuit for correcting degradation of a frequency characteristic of an information signal and includes a peak hold circuit for detecting an envelope of an output of said emphasis circuit.

11. An optical disk storage accessing apparatus according to claim 10, wherein said track deviation detection circuit includes a low band amplifier and a high band amplifier, and an output of said high band amplifier after being processed through said emphasis circuit and said peak hold circuit is added to an output of said low band amplifier.

12. An optical disk storage accessing apparatus according to claim 9, further comprising correcting means for correcting said number of tracks based on an amount of eccentricity of said optical disk.

* * * * *